(12) United States Patent
Beltran et al.

(10) Patent No.: US 12,053,704 B2
(45) Date of Patent: Aug. 6, 2024

(54) ARTIFICIAL INTELLIGENCE (AI) MODEL TRAINING TO GENERATE AN AI MODEL PERSONALIZED TO A USER

(71) Applicant: Sony Interactive Entertainment LLC, San Mateo, CA (US)

(72) Inventors: Justin V. Beltran, Tustin, CA (US); Dylan Butler, Mission Viejo, CA (US); Kevin Kragenbrink, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/712,049

(22) Filed: Apr. 1, 2022

(65) Prior Publication Data

US 2022/0219087 A1    Jul. 14, 2022

Related U.S. Application Data

(63) Continuation of application No. 16/807,945, filed on Mar. 3, 2020, now Pat. No. 11,291,917, which is a continuation of application No. 16/180,787, filed on Nov. 5, 2018, now Pat. No. 10,576,380.

(51) Int. Cl.
*A63F 13/77* (2014.01)
*A63F 13/65* (2014.01)
*G06N 20/00* (2019.01)

(52) U.S. Cl.
CPC .............. *A63F 13/77* (2014.09); *A63F 13/65* (2014.09); *G06N 20/00* (2019.01)

(58) Field of Classification Search
CPC .......... A63F 13/77; A63F 13/65; G06N 20/00
See application file for complete search history.

(56) References Cited

U.S. PATENT DOCUMENTS

| | | | |
|---|---|---|---|
| 10,272,341 B1* | 4/2019 | Blackwell | A63F 13/67 |
| 10,576,380 B1* | 3/2020 | Beltran | A63F 13/67 |
| 11,189,188 B2* | 11/2021 | Morton | G09B 19/0053 |
| 2017/0160706 A1* | 6/2017 | Düll | G05B 13/042 |
| 2017/0304707 A1* | 10/2017 | Morton | G06N 3/006 |
| 2017/0357910 A1* | 12/2017 | Sommer | G06N 20/00 |
| 2018/0001205 A1* | 1/2018 | Osman | A63F 13/67 |
| 2018/0001206 A1* | 1/2018 | Osman | A63F 13/798 |
| 2018/0018590 A1* | 1/2018 | Szeto | G06N 20/00 |
| 2019/0012602 A1* | 1/2019 | Mishra | H04L 67/63 |
| 2019/0076731 A1* | 3/2019 | Hickman | G06F 16/51 |
| 2019/0197402 A1* | 6/2019 | Kovács | G06N 3/045 |

(Continued)

*Primary Examiner* — Corbett B Coburn
(74) *Attorney, Agent, or Firm* — PENILLA IP, APC

(57) ABSTRACT

A method for processing an artificial intelligence (AI) model for a gaming application. The method includes training the AI model from a plurality of game plays of a scenario of the gaming application using training state data collected from the plurality of game plays of the scenario and associated success criteria of each of the plurality of game plays. The method includes receiving first input state data during a first game play of the scenario. The method includes applying the first input state data to the AI model to generate an output indicating a degree of success for the scenario for the first game play. The method includes performing an analysis of the output based on a predefined objective. The method includes performing an action to achieve the predefined objective based on the output that is analyzed.

20 Claims, 18 Drawing Sheets

(56) References Cited

U.S. PATENT DOCUMENTS

| | | | |
|---|---|---|---|
| 2019/0318202 A1* | 10/2019 | Zhao | G06F 18/24323 |
| 2019/0318254 A1* | 10/2019 | Lobete | G06N 5/045 |
| 2019/0318267 A1* | 10/2019 | Zhang | G06N 20/00 |
| 2020/0197815 A1* | 6/2020 | Beltran | A63F 13/67 |
| 2021/0170230 A1* | 6/2021 | Tormasov | A63B 24/0021 |
| 2021/0339146 A1* | 11/2021 | Rico | A63F 13/795 |

* cited by examiner

ARTIFICIAL INTELLIGENCE (AI) MODEL TRAINING TO GENERATE AN AI MODEL PERSONALIZED TO A USER

CLAIM OF PRIORITY

This application is a continuation of and claims priority to and the benefit of U.S. application Ser. No. 16/807,945 filed on Mar. 3, 2020, which issued into U.S. Pat. No. 11,291,917 on Apr. 5, 2022, entitled "Artificial Intelligence (AI) Model Training Using Cloud Gaming Network"; which is a continuation of and claims priority to and the benefit of U.S. application Ser. No. 16/180,787 filed on Nov. 5, 2018, which issued into U.S. Pat. No. 10,576,380 on Mar. 3, 2020, entitled " Artificial Intelligence (AI) Model Training Using Cloud Gaming Network," all of which are incorporated herein by reference in their entireties for all purposes.

TECHNICAL FIELD

The present disclosure is related to artificial intelligence (AI) model training, and more specifically to using a network of server consoles of a game cloud system to farm training data associated with remote players, the training data used for AI model training.

BACKGROUND OF THE DISCLOSURE

Artificial intelligence algorithms are designed to learn from data. An AI model can be built based on the learned data, and is flexible enough to perform multiple functions depending on the input provided to the AI model.

However, providing the data to train an AI model is complex. In a less than straightforward example, an AI model configured for recognizing objects is trained using a vast number of object images. For example, a vast number of object images are used for training the AI model. Generation and collection of those images is difficult and very time consuming Basically, the AI model is trained to recognize every type of object that exists. Imagine trying to collect for each object multiple images of that object that are taken from different perspectives. In that manner, when presented with a new image of an object, the AI model can extract various identifying characteristics (e.g., outline, color, features, size, etc.) to determine if those characteristics match those of a learned object. The number of objects is limitless, and various views of those objects are also limitless. As such, the training of the AI model to recognize objects can be an ongoing process.

It is in this context that embodiments of the disclosure arise.

SUMMARY

Embodiments of the present disclosure relate to systems and methods for training an AI model that relates to game play of a gaming application. The AI model is built through a deep learning engine, the AI model being configured to provide various functionalities in relation to a gaming application, and/or game play of the gaming application (e.g., providing recommendations, finding weaknesses of the player, finding flaws in the gaming application, training the player, providing an opponent to the player, etc.). The AI model can be trained using a vast network of servers (e.g., server consoles, gaming servers, etc.) that are configured to execute instances of the gaming application in support of multiple game plays. For example, the network of servers may be supporting game plays of remote users, each of which is playing the gaming application through a corresponding client device. In the normal course of supporting the game plays of the remote users, training data may be collected from the network of servers, and used for training an AI model related to the gaming application. By farming training data from an existing network of servers configured to support the game plays of remote users, the time and effort consumed when collection of the training data is centralized and reduced. That is, there is a significant reduction in the time needed to build input sets of training data by recording across the network of servers. In part, the AI model learns the intricacies of the gaming application and how to play the gaming application. In that manner, given as input a condition of a game play of the gaming application (e.g., game state of a particular game play), the AI model can analyze the condition and provide an appropriate response to the condition. The response may be dependent on a predefined objective. Because the AI model understands how to play the gaming application given varying objectives (e.g., exploratory, straightforward to the ending, easiest play, most difficult play, etc.), the AI model can determine how to direct the game play (e.g., determine what are the next input sequences necessary to achieve a corresponding objective). Specifically, the AI model can be used to perform various functionalities related to the gaming application and/or the game play of the gaming application, wherein the functionalities are dependent on corresponding predefined objectives. For example, the AI model can be used to train pro-gamers to be the best of all gamers by pitting the student gamer against an ultimate opponent, or by guiding the student gamer through various challenges to improve weaknesses in the student gamer. In addition, the AI model can be continually refined through the continued collection of training data, and comparing the new training data to existing training data based on success criteria.

In one embodiment, a method for AI training and application, and more specifically, a method for processing an AI model for a gaming application is disclosed. The method includes training the AI model from a plurality of game plays of a scenario of the gaming application using training state data collected from the plurality of game plays of the scenario and associated success criteria of each of the plurality of game plays. The method includes receiving first input state data during a first game play of the scenario. The method includes applying the first input state data to the AI model to generate an output indicating a degree of success for the scenario for the first game play. The method includes performing an analysis of the output based on a predefined objective. The method includes performing an action to achieve the predefined objective based on the output that is analyzed.

In another embodiment, a non-transitory computer-readable medium storing a computer program for AI training and application is disclosed. The computer-readable medium includes program instructions for processing an AI model for a gaming application. The computer-readable medium includes program instructions for training the AI model from a plurality of game plays of a scenario of the gaming application using training state data collected from the plurality of game plays of the scenario and associated success criteria of each of the plurality of game plays. The computer-readable medium includes program instructions for receiving first input state data during a first game play of the scenario. The computer-readable medium includes program instructions for applying the first input state data to the AI model to generate an output indicating a degree of success for the scenario for the first game play. The computer-readable medium includes program instructions for performing an analysis of the output based on a predefined objective. The computer-readable medium includes program instructions for performing an action to achieve the predefined objective based on the output that is analyzed.

In still another embodiment, a computer system is disclosed, wherein the computer system includes a processor and memory coupled to the processor and having stored therein instructions that, if executed by the computer system, cause the computer system to execute a method for processing an AI model for a gaming application is disclosed. The method as executed by the computer system includes training the AI model from a plurality of game plays of a scenario of the gaming application using training state data collected from the plurality of game plays of the scenario and associated success criteria of each of the plurality of game plays. The method includes receiving first input state data during a first game play of the scenario. The method includes applying the first input state data to the AI model to generate an output indicating a degree of success for the scenario for the first game play. The method includes performing an analysis of the output based on a predefined objective. The method includes performing an action to achieve the predefined objective based on the output that is analyzed.

In another embodiment, a method for AI training is disclosed. The method includes executing at a plurality of servers a plurality of instances of a gaming application, the plurality of instances supporting a plurality of game plays of the gaming application. The method includes collecting at the plurality of servers training state data associated with corresponding game plays of a scenario of the gaming application. The method includes defining success criteria for the training state data. The method includes training an AI model for the scenario by providing the training state data and the success criteria to a deep learning engine, wherein the trained AI model provides a plurality of outputs for a plurality of inputs.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 3C-1 is a screen shot of a game play of a gaming application and illustrates one type of success criteria that may be used to train an AI model that understands how to play the gaming application, in accordance with one embodiment of the present disclosure.

FIG. 3C-2 is an illustration of the collection of training state data from a plurality of game plays, wherein a plurality of instances is executing on a plurality of servers in support of the game plays, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing deep learning (also referred to as machine learning) techniques to build an AI model that is related to a gaming application, and/or game plays of the gaming application. In particular, the AI model is configured to provide various functionalities in relation to a gaming application and/or to game play of the gaming application, including predicting and/or determining what actions to take in response to a given condition (e.g., game state) of the gaming application. For example, the AI model can be used to train pro-gamers to be the best of all gamers. The AI model is trained and/or built using a network of servers (e.g., through a cloud game system) executing instances of the gaming application supporting one or more game plays. The AI model may be trained based on success criteria, such as following one path over another similar path through the AI model that is more successful in terms of the success criteria. That is, the AI model learns to take the more successful path. In addition, the AI model can be continually refined through the continued collection of training data, and comparing the new training data to existing training data, with selection of the best training data based on the success criteria.

With the above general understanding of the various embodiments, example details of the embodiments will now be described with reference to the various drawings.

Figure 1A:
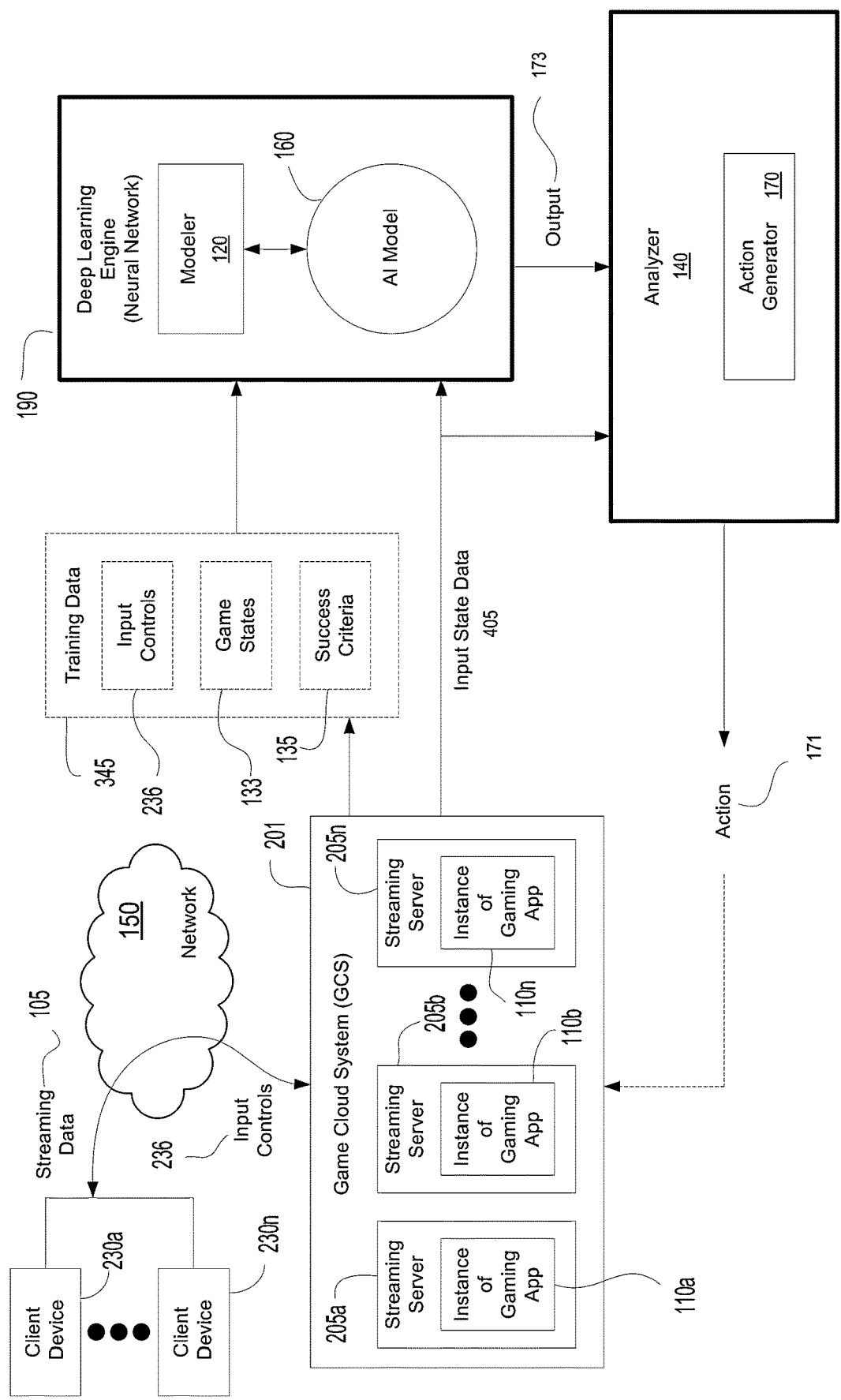
FIG. 1A is a system for training an artificial intelligence (AI) model through a network of back-end servers executing instances of a gaming application, the AI model being used for provide various functionalities in relation to the gaming application, in accordance with one embodiment of the present disclosure.

FIG. 1A is a system 100A for training an artificial intelligence (AI) model 160 through a network of back-end servers (e.g., game cloud system) executing instances of a gaming application, in accordance with one embodiment of the present disclosure. The AI model is used for provide various functionalities in relation to the gaming application and/or game plays of the gaming application, in accordance with one embodiment of the present disclosure. In particular, the trained AI model 160 may be implemented and/or supported by a back-end server through a network 150 (e.g., internet), wherein the back-end server provides artificial intelligence and/or deep, machine learning (e.g., through the deep, machine, learning engine 190) for building and applying the trained AI model 160 that relates to a gaming application and/or game plays of the gaming application of one or more players in one or more locations throughout the world. The trained AI model 160 is trained to learn the intricacies of the gaming application, and/or intricacies of playing the gaming application (e.g., through a corresponding game play). In that manner, given as input a condition of a game play of the gaming application (e.g., game state of a particular game play), the AI model can analyze the condition and provide an appropriate response to the condition. The response may be dependent on a predefined objective (e.g., provide assistance, etc.). For example, the trained AI model 160 is able to determine how the gaming application should respond, or how the player should respond during a corresponding game play.

As shown, a plurality of client devices 230 (e.g., devices 230a through 230n) is connected through a network 150 (e.g., internet) to a back-end game cloud system (GCS) 201 to support a plurality of game plays of a particular gaming application. For example, a plurality of remote players is playing the gaming application through respective client devices 230. The client device can be any type of computing device having at least a memory and a processor module that is capable of connecting to the back-end server system (e.g., GCS 201) over network 150. A corresponding client device is configured to interact with an instance of a corresponding gaming application as executed locally or remotely to implement a game play of a corresponding player, such as through input commands that are used to drive game play.

The GCS 201 includes a plurality of servers 205 (e.g., servers 205a though 205n) executing a plurality of instances of the gaming application 110 (e.g., instances 110a through 110n). For example, server 205a is configured to execute instance 110a of the gaming application in support of a corresponding game play of a corresponding player through a corresponding client device. Each of the servers 205 may be configured as having at least a memory and a processor module that is capable of executing the gaming application, such as through a corresponding instance of the gaming application, in support of a corresponding game play. For example, each server 205 may be a server console, gaming console, computer, etc. Each server 205 is configured to stream data 105 (e.g., rendered images and/or frames of a corresponding game play) back to a corresponding client device through network 150. In that manner, a computationally complex gaming application may be executing at the back-end server in response to controller inputs received and forwarded by a corresponding client device. Each server is able to render images and/or frames that are then encoded (e.g., compressed) and streamed to the corresponding client device for display.

In one embodiment, GCS 201 includes a distributed game engine system and/or architecture. In particular, a distributed game engine executing game logic is configured as a corresponding instance of the gaming application. In general, the distributed game engine takes each of the functions of a game engine and distributes those functions for execution by a multitude of processing entities. Individual functions can be further distributed across one or more processing entities. The processing entities may be configured in different configurations, including as metal or physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the GCS 201, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

These various functions performed by a game engine include basic processor based functions for executing the gaming application and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include streaming, encoding, memory management, multi-thread management, quality of service (QoS), bandwidth testing, social networking, management of social friends, communication with social networks of friends, communication channels, texting, instant messaging, chat support, etc.

In addition, the distribution synchronization layer can easily be scaled (on an individual distributed game engine) to handle increased processing demand or complexity of processing by adding more processing entities. That is, the processing power can be elastically increased or decreased based on demand. Also, the distributed game engine system can be scaled across many users, each of which is supported by a corresponding distributed game engine, such as in a multi-player gaming session for the gaming application. As such, the multi-player gaming session is not constrained by hardware limitations that limit the maximum number of players in the session because of performance issues (e.g., latency). Instead, the scalable distributed gaming engine system is able to scale up or down the number of distributed gaming engines depending on the number of players participating in the multi-player gaming session without any hardware constraints. As such, many thousands of players may participate in a single multi-player gaming session.

In system 100A, an AI model 160 can be built (e.g., trained) using the network of servers that are configured to execute instances of the gaming application in support of the multiple game plays. In particular, training data 345 is collected from the execution of the instances of the gaming application at the plurality of servers 205. In particular, the collection for use as training data is performed without the knowledge of any of the remote players that are associated with the various game plays of the gaming application. The training data 345 includes controller input 236 used to direct corresponding game plays, game states 133 of the instances of the gaming application occurring during the game plays, response metrics, success criteria 135, success metrics, additional analysis performed on the game plays, etc. In some cases, the training data 345 can be generated by the instances of the gaming application (e.g., game state metadata, etc.). The training data 345 is provided as input into deep learning and/or machine learning engine 190. The deep learning engine 190 includes a modeler 120 that is configured to build and/or train the AI model 160 using the training data 345, as will be further described below in relation to FIGS. 1B, and 3A, 3B-1 and 3B-2.

The AI model 160 may be implemented during subsequent game play (e.g., after training of the AI model) of the gaming application (e.g., by a player, by an automatic player, etc.). For example, the AI model may be implemented and/or executed at a back-end server in support of the game play, wherein the game play may be executing on a local device (to the player) or at a back-end server. For example, the AI model that is trained is implemented by the deep learning engine 190 to provide various functionalities to game plays of the gaming application.

As shown, analyzer 140 is configured to utilize the AI model 160 that is trained to provide various functionalities in relation to a game play of the gaming application. In particular, an input data stream 405 is provided as input to the deep learning engine 190 that is configured to implement the trained AI model 160. The trained AI model 160 provides an output in response to the input, wherein the output is dependent on the predefined functionality and/or predefined objective of the trained AI model 160. For example, the trained AI model 160 may be used by the analyzer 140 to determine what actions need to be taken during the game play—either by the player, or by the corresponding executing instance of the gaming application. The analyzer 140 includes an action generator 170 that is configured to perform an action responsive to the input state data 405 and in consideration of the predefined objective of the trained AI model 160. In that manner, the analyzer through the use of the AI model 160 can provide various functionalities, including providing services to the player playing the gaming application (e.g., providing recommendations, finding weaknesses of the player, training the player, providing an opponent to the player, finding flaws in the gaming application, etc.).

More particularly, the analyzer 140 is configured to perform various functionalities in relation to a gaming application and/or game plays of the gaming application. The analyzer 140 is configured to analyze the output from the trained AI model 160 for a given input (e.g., controller input 236, game state data 133, success criteria 135), and provide a response (e.g., an action). For example, the analyzer 140 may provide a profile of a player playing the gaming application; provide a recommendation to a player during game play of a gaming application by the player, wherein the recommendation may be structured in consideration of the user profile; take over the game play; build teams (e.g., teams that are competing against each other in the gaming application) that are fairly balanced using player profiles; auto play the gaming application, such as for purposes of automatically training the AI model; provide a bot opponent; explore the gaming application; determine a weakness of a corresponding player, and to perform services that help the player to overcome the weakness, etc.

Figure 1B:
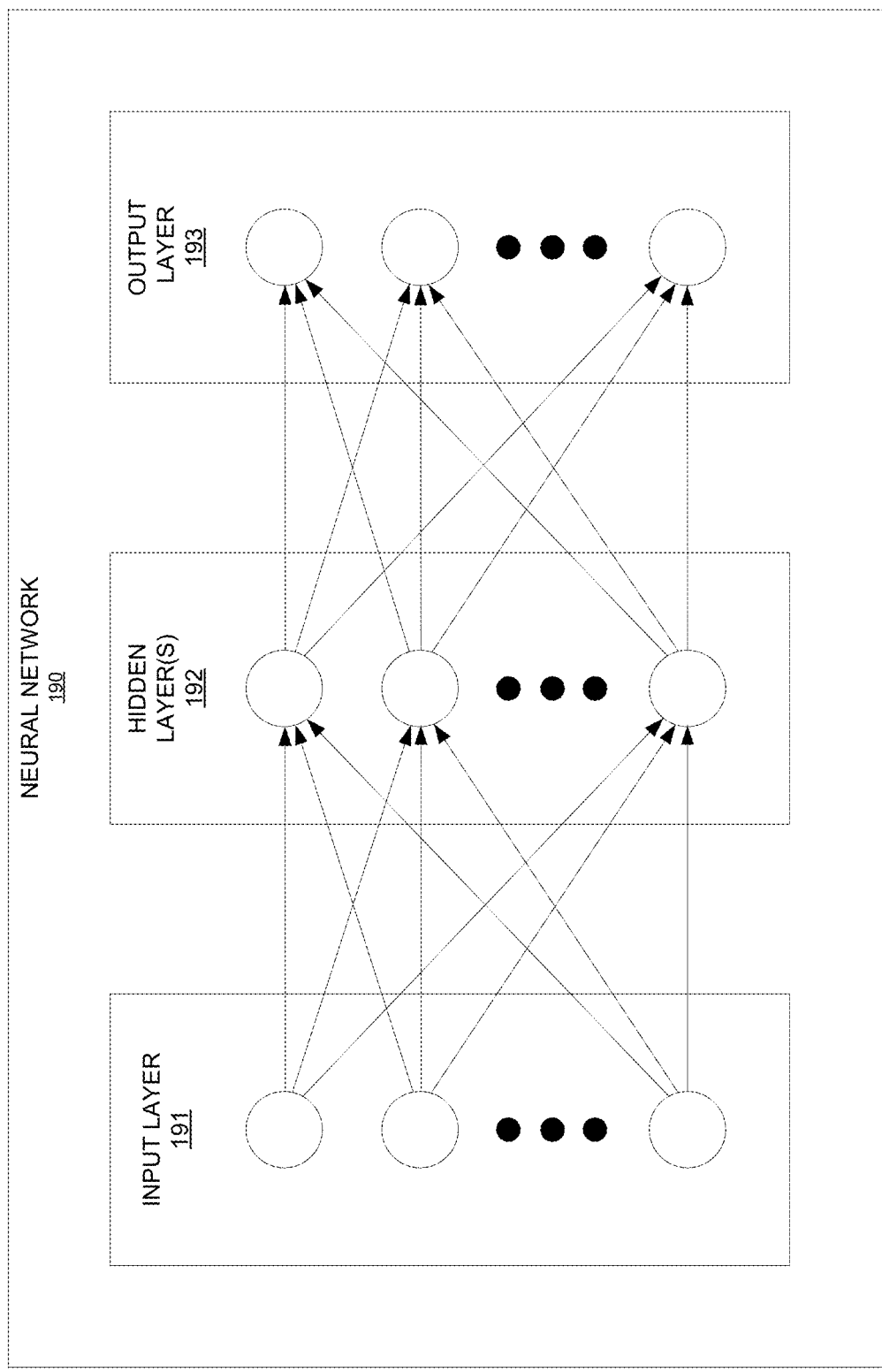
FIG. 1B illustrates an example neural network used to build an AI model, in accordance with one embodiment of the present disclosure.

FIG. 1B illustrates an example neural network 190 (e.g., deep learning engine) used to build a trained AI model that learns, in part, the intricacies of a gaming application and how to play the corresponding gaming application. In that manner, given as input a condition of a game play of the gaming application (e.g., game state of a particular game play) the AI model can analyze the condition and provide an appropriate response to the condition. For example, the AI model can be used to provide various functionalities in relation to a gaming application and/or to game play of the gaming application, including predicting and/or determining what actions to take in response to a given condition (e.g., game state) of the gaming application.

More particularly, the AI model is trained and/or built using a network of servers (e.g., through a cloud game system) executing instances of the gaming application supporting one or more game plays. The training is implemented by the deep learning engine 190, in accordance with one embodiment of the present disclosure. The neural network 190 may be implemented within an AI processor or engine 210 at a back-end server, in one embodiment. In particular, the modeler 120 of the deep learning engine 190 in system 100A of FIG. 1A is configured to learn everything about the gaming application for use in subsequent game plays of the gaming application by any player (e.g., real or virtual).

Specifically, the deep learning or machine learning engine 190 in cooperation with modeler 120 is configured to analyze training data 345 that is collected at a plurality of back-end servers configured for executing a plurality of instances of a gaming application. The deep learning engine 190 utilizes artificial intelligence, including deep learning algorithms, reinforcement learning, or other artificial intelligence-based algorithms to build a trained AI model that relates to the gaming application and/or game plays of the gaming application. In that manner, a vast collection of training data may be efficiently collected, in part, to help define the gaming application, and/or any game play of the gaming application, to include the contexts within which the gaming application may present (e.g., different scenarios, and parts within those scenarios, as defined within the trained AI model. Further, the AI model can be used (e.g., during training or after training, such as by the analyzer 140 of the AI processor engine 210) to provide various functionalities in relation to the gaming application and/or game plays of the gaming application in any subsequent game play of the gaming application. As such, the deep learning engine 190 is able to learn everything about the gaming application and/or game plays of the gaming application, so that the trained AI model can be used to provide the best services for subsequent game plays of the gaming application, such as to a player. For example, the trained AI model may be used to train a pro-gamer to be the best gamer in the world, or to provide various tutorial sessions (e.g., video instruction, game play challenges, etc.) that are designed to address the weaknesses of the player. The deep learning engine 190 may be configured to continually refine the trained AI model given any updated training data. The refinements are based on determining which sets of training data can be used for training based on how those sets perform within the gaming application based on corresponding success criteria.

More particularly, during the learning and/or modeling phase, the training data 345 is used by the deep learning engine 190 to predict and/or determine how successful a particular game play of a gaming application will turn out given a set of input data. The resulting AI model of the gaming application can be used to determine actions to be performed, for a given game play of a gaming application given the set of input data. That is, the trained AI model can be used (e.g., by analyzer 140) to provide various functionalities related to a gaming application and/or game plays of the gaming application. For example, the input data may be game state data (e.g., including controller input, etc.), and the trained AI model 160 may be used to generate a response to the input data. The response may be provided with or without any request or knowledge by the user.

For example, the trained AI model 160 may be used by the analyzer 140 to provide recommendations to a player playing the gaming application. The AI model 160 may be used by the analyzer 140 to create a user profile of the player that is specific to the gaming application, or to a scenario of the gaming application. The AI model 160 may be used by the analyzer 140 to control a bot opponent within the gaming application, such as when training the player against the best opponent in the world as created through training data, when training the player against a virtual me opponent so that the user is able to get incrementally better through self-play (e.g., playing against a virtual version of himself or herself) (and that continually gets refined through that self-play). The AI model 160 may be used by the analyzer 140 to discover weaknesses of the player and to provide tutorial sessions to address those weaknesses. The AI model 160 may be used by the analyzer 140 to discover problems within the gaming application (e.g., holes in the code that lead to glitches, etc.). Still other functionalities are supported, though not necessarily described.

The neural network 190 represents an example of an automated analysis tool for analyzing data sets to determine the intricacies of playing a gaming application, to include the responses and/or actions that can be determined and/or performed during a game play of a gaming application. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning, or rewards based learning (e.g., through the use of success criteria, success metrics, etc.). For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to instances of a game play of the gaming application, wherein the instances include one or more features that define that instance (e.g., controller input, game state, results data, etc.). The intermediary predictions of the model are determined through a classifier that creates labels (e.g., outputs, features, nodes, classifications, etc.).

At the highest hierarchical level, an output layer 193 exists. The output layer 193 includes a set of output nodes. An output node represents a decision (e.g., action, prediction, prediction of success of a game play for a given set of input data, etc.) that relates to one or more components of a trained AI model 160, for example. As previously described, the output nodes may identify the predicted or expected actions, or learned actions for a given set of inputs, wherein the inputs may define various scenarios or parts of scenarios of a gaming application. These results can be compared to predetermined and true results, or learned actions and results, as obtained from the game plays used for collecting the training data in order to refine and/or modify the parameters used by the deep learning engine 190 to iteratively determine the appropriate predicted or expected responses and/or actions for a given set of inputs. That is, the nodes in the neural network 190 learn the parameters of the trained AI model 160 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses and/or actions to be performed for a given set of inputs or input data. In this illustration, the data domain includes game play data collected through multiple game plays of multiple users to define baseline input data. In another example, the training dataset is from different data domains to include input data other than baseline.

As such, the neural network 190 may predict or determine, in part, predicted or expected responses and/or actions to be performed for a given set of inputs (a condition of a gaming application, such as game state). Based on these predictive results, the neural network 190 may also define the trained AI model 160 that is used to provide determine those results and/or actions (e.g., the various functionalities relating to the gaming application and/or game plays of the gaming application) to be performed given a set of inputs.

Figure 2A:
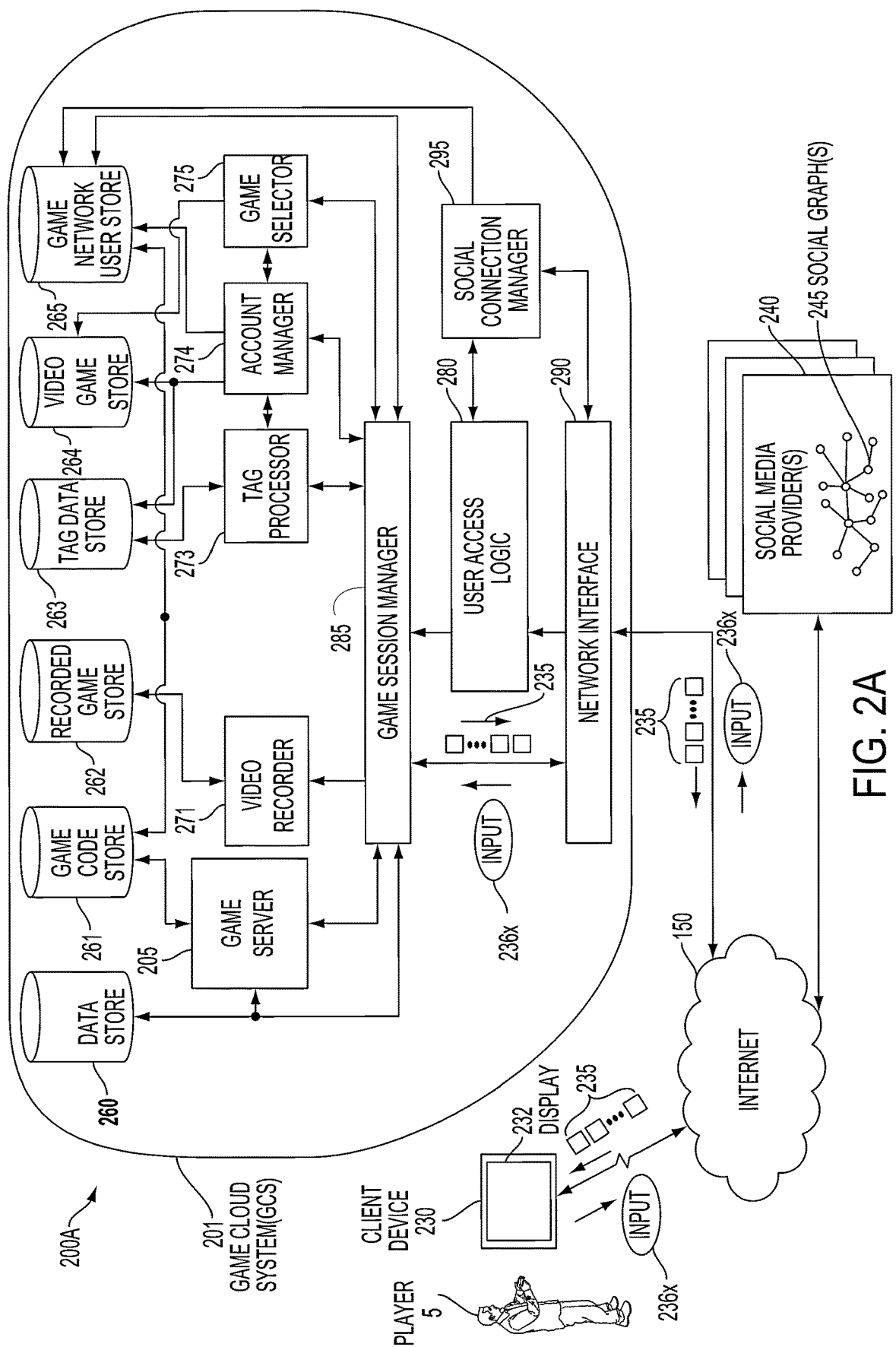
FIG. 2A illustrates a system diagram 200 to provide gaming over a cloud game network, in accordance with one embodiment of the present disclosure.

FIG. 2A illustrates a system 200A supporting the collection of training data used to build and/or train an AI model relating to a gaming application and/or game plays of the gaming application, in accordance with one embodiment of the present disclosure. In particular, system diagram 200A enables access and playing of video games stored in a game cloud system (GCS) 201. Generally speaking, game cloud system GCS 201 may be a cloud computing system operating over a network 220 to support a plurality of players playing a gaming application through corresponding game plays. Data related to those game plays may be provided as training data used for building and/or training an AI model relating to the gaming application and/or game plays of the gaming application. In particular, system 200A includes GCS 201, one or more social media providers 240, and a client device 230, all of which are connected via a network 150 (e.g., internet). One or more user devices may be connected to network 150 to access services provided by GCS 201 and social media providers 240.

In one embodiment, game cloud system 201 includes a game server 205, a video recorder 271, a tag processor 273, and account manager 274 that includes a user profile manager, a game selection engine 275, a game session manager 285, user access logic 280, a network interface 290, and a social media manager 295. GCS 201 may further include a plurality of gaming storage systems, such as a game state store, random seed store, user saved data store, snapshot store, which may be stored generally in datastore 260. Other gaming storage systems may include a game code store 261, a recorded game store 262, a tag data store 263, video game data store 264, and a game network user store 265. In one embodiment, GCS 201 is a system that can provide gaming applications, services, gaming related digital content, and interconnectivity among systems, applications, users, and social networks. GCS 201 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

Player/user 5 is able to access services provided by GCS 201 via the game session manager 285. For example, account manager 274 enables authentication and access by player 5 to GCS 201. Account manager 274 stores information about member users/players. For instance, a user profile for each member user may be managed by account manager 274. In that manner, member information can be used by the account manager 274 for authentication purposes. For example, account manager 2274 may be used to update and manage user information related to a member user. Additionally, game titles owned by a member user may be managed by account manager 274. In that manner, video games stored in data store 264 are made available to any member user who owns those video games.

In one embodiment, a user, e.g., player 5, can access the services provided by GCS 201 and social media providers 240 by way of client device 230 through connections over network 150. Client device 230 can include any type of device having a processor and memory, wired or wireless, portable or not portable. In one embodiment, client device 230 can be in the form of a smartphone, a tablet computer, or hybrids that provide touch screen capability in a portable form factor. One exemplary device can include a portable phone device that runs an operating system and is provided with access to various applications (apps) that may be obtained over network 150, and executed on the local portable device (e.g., smartphone, tablet, laptop, desktop, etc.).

Client device 230 includes a display 232 that acts as an interface for player 5 to send input commands 236 and display data and/or information 235 received from GCS 201 and social media providers 240. Display 232 can be configured as a touch-screen, or a display typically provided by a flat-panel display, a cathode ray tube (CRT), or other device capable of rendering a display. Alternatively, the client device 230 can have its display 232 separate from the device, similar to a desktop computer or a laptop computer.

In one embodiment, client device 230 is configured to communicate with GCS 201 to enable player 5 to play a video game. For example, player 5 may select (e.g., by game title, etc.) a video game that is available in the video game data store 264 via the game selection engine 275. In that manner, the selected video game is enabled and loaded for execution by game server 205 on the GCS 201. In one embodiment, game play is primarily executed in the GCS 201, such that client device 230 will receive a stream of game video frames 235 from GCS 201, and user input commands 236 for driving the game play is transmitted back to the GCS 201. The received video frames 235 from the streaming game play are shown in display 232 of client device 230.

In one embodiment, after player 5 chooses an available game title to play, a game session for the chosen game title may be initiated by the player 5 through game session manager 285. Game session manager 285 first accesses game state store in data store 140 to retrieve the saved game state of the last session played by the player 5 (for the selected game), if any, so that the player 5 can restart game play from a previous game play stop point. Once the resume or start point is identified, the game session manager 285 may inform game execution engine in game processor 210 to execute the game code of the chosen game title from game code store 261. After a game session is initiated, game session manager 285 may pass the game video frames 235 (i.e., streaming video data), via network interface 290 to a client device, e.g., client device 230.

During game play, game session manager 285 may communicate with game processor 210, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data store 263.

During game play, game session manager 285 may communicate with game processor 204 to deliver and obtain user input commands 236 that are used to influence the outcome of a corresponding game play of a video game. Input commands 236 entered by player 5 may be transmitted from client device 230 to game session manager 285 of GCS 201. Input commands (e.g., controller inputs) 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a video game may be used to enable multiple features that may be available to the user.

Figure 2B:
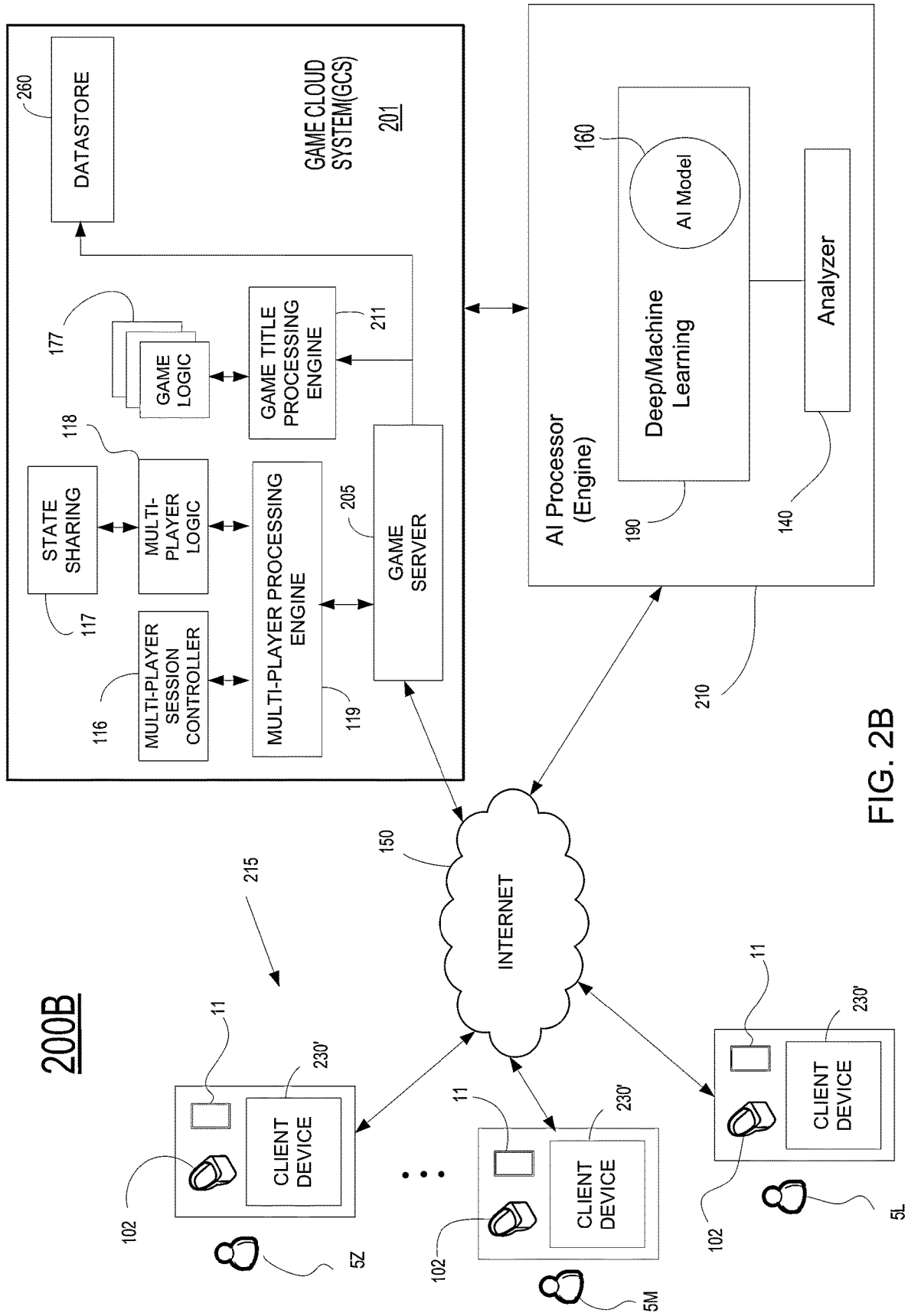
FIG. 2B illustrates a system providing gaming to multiple players of a gaming application that is executed over a cloud game network, and the collection of training data from the game plays of those players for use in training an AI model, wherein the AI model is configured to provide various functionalities in relation to the gaming application and/or game play of the gaming application, in accordance with one embodiment of the present disclosure.

FIG. 2B illustrates a system 200B providing the collection of training data used to build and/or train an AI model 160 relating to a gaming application and/or game plays of the gaming application, wherein instances and/or instantiations of the gaming application in support of the game plays are executed over a cloud game network, in accordance with one embodiment of the present disclosure. In addition, the system 200A is configured to support implementation of the AI model 160 that is trained to provide various functionalities relating to the gaming application and/or game plays of the gaming application (e.g., provide recommendations, train the player, discover weaknesses of the player, provide bot opponents, etc.).

As shown, system 200B provides gaming control to a plurality of players 215 (e.g., players 5L, 5M . . . 5Z) playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In other embodiments, GCS 201 includes a distributed game engine system and/or architecture that is executing game logic, as configured as a corresponding instance of the gaming application. In general, the distributed game engine takes each of the functions of a game engine and distributes those functions for execution by a multitude of processing entities across one or more servers of the GCS 201. Individual functions can be further distributed across one or more processing entities. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 215. In that manner, back-end server support provides streaming of media (e.g., video, audio, etc.) of game plays of a plurality of gaming applications to a plurality of corresponding users. As will be further described below, training data collected from the plurality of game processors executing instances of the gaming application is used to build and/or train an AI model relating to the gaming application and/or game plays of the gaming application.

A plurality of players 215 accesses the game cloud system 210 via network 150, wherein players (e.g., players 5L, 5M . . . 5Z) access network 150 via corresponding client devices 230'. Client device 230' may be configured similarly as client device 230 of FIG. 1A, or may be configured as a thin client providing that interfaces with a back end server providing computational functionality. In particular, a client device 230' of a corresponding player 5L is configured for requesting access to gaming applications over a network 150, such as the internet, and for rendering instances of gaming application (e.g., video game) executed by the game server 205 and delivered to a display device associated with the corresponding player 5L. For example, player 5L may be interacting through client device 230' with an instance of a gaming application executing on game processor of game server 205. More particularly, an instance of the gaming application is executed by the game title execution engine 211 (e.g., game engine) that is running game logic 177 corresponding to the gaming application. Game logic (e.g., executable code) 177 implementing the gaming application is stored and accessible through data store 260, or game code store 261, or video game store 264, etc., previously described, and is used to execute the gaming application.

Game title processing engine 211 is able to support a plurality of gaming applications using a plurality of game logics 177, as shown.

As previously described, client device 230' may receive input from various types of input devices 11, such as game controllers, tablet computers, keyboards, gestures captured by video cameras, mice touch pads, etc. Client device 230' can be any type of computing device having at least a memory and a processor module that is capable of connecting to the game server 205 over network 150. Also, client device 230' of a corresponding player is configured for generating rendered images executed by the game title execution engine 211 executing remotely, and for displaying the rendered images on a display, including a head mounted display (HMD) 102. For example, a corresponding client device 230' is configured to interact with an instance of a corresponding gaming application as executed remotely to implement a game play of a corresponding player, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, players in the session can communicate with each other as controlled by the multi-player session controller 116.

Further, multi-player processing engine 119 communicates with multi-player logic 118 in order to enable interaction between players within corresponding gaming environments of each player. In particular, state sharing module 117 is configured to manage states for each of the players in the multi-player gaming session. For example, state data may include game state data that defines the state of the game play (of a gaming application) for a corresponding player (e.g., player 5L) at a particular point, as previously described. Further, state data may include user/player saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the AI processor 210, which may be integrated within GCS 201 or located remote from GCS 201, may provide for the building and/or training of the AI model 160 relating to a gaming application and/or game plays of the gaming application, and also provide for the implementation and/or application of the AI model 160. In particular, the back-end AI processor 210 includes the deep learning engine 190, previously described, that is configured for learning and/or modeling, in part, the responses and/or actions (e.g., controller inputs, etc.) to be performed for any given set of inputs (e.g., that define a condition of a game play of a gaming application, including game state, etc.) in order to build (e.g., through the modeler 120) and apply (e.g., through analyzer 140) the trained AI model in relation to a gaming application and/or subsequent game play of the gaming application. For example, the modeler 120 within the deep learning engine 190 may operate to set the parameters defined within the deep learning engine 190 that define the various nodes in the input layer 191, hidden layers 192, and output layer 193, for purposes applying the trained AI model 160 within the deep learning engine 190. The modeler 120 may set the parameters in the AI model 160 based on one or more success criteria used during training, as previously described. In that manner, the AI model 160 is trained to learn the intricacies of the gaming application and/or the intricacies of playing the gaming application so that the AI model 160 can be used to provide various functionalities in relation to the gaming application and/or a game play of the gaming application (e.g., predicting and/or determining what actions, to include controller inputs, to take in response to a given condition, such as game state). As such, the analyzer 140 is able to analyze the output from the AI model 160 responding to input defining a condition of a game play, and optionally the input (e.g., input state data), in order to provide an appropriate response to the condition, wherein the response may be dependent on a predefined objective (e.g., provide assistance, providing coaching, etc.).

Figure 3A:
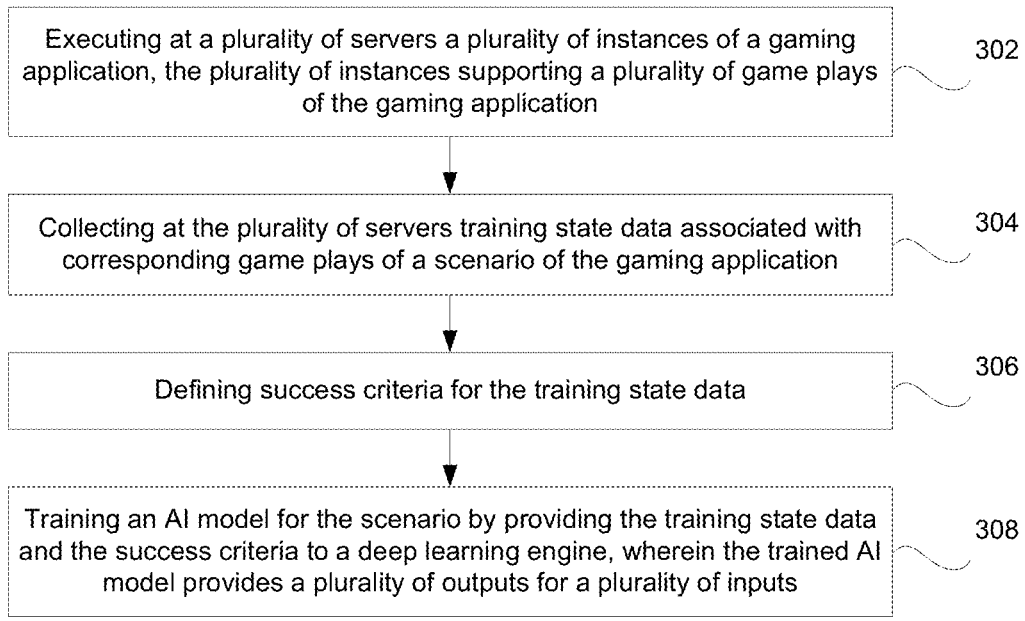
FIG. 3A is a flow diagram illustrating a method for training an AI model through a network of back-end servers executing instances of the gaming application, the AI model being used for provide various functionalities in relation to the gaming application and/or game plays of the gaming application, in accordance with one embodiment of the present disclosure.

With the detailed description of the various modules of the system 100A and system 200B, flow diagram 300A of FIG. 3A discloses a method for training an AI model through a network of back-end servers executing instances of the gaming application, the AI model being used for provide various functionalities in relation to the gaming application and/or game plays of the gaming application, in accordance with one embodiment of the present disclosure. Flow diagram 300A may be implemented within a back-end server (e.g., within the game cloud system 201 in combination with a deep learning engine 190), previously described.

In particular, at 302 the method includes executing at a plurality of servers a plurality of instances of a gaming application, the plurality of instances supporting a plurality of game plays of the gaming application. For example, the plurality of servers may be operating within a game cloud system (e.g., GCS 201) previously described, wherein the gaming application is executing remotely from a corresponding player, and media (e.g., video frames, audio, etc.) is streamed to the client device of the player over a network. In that case, the plurality of game plays of the gaming application is controlled by a plurality of players via corresponding client devices, wherein the client devices are remote from the servers. In other implementations, the gaming application is executing locally to a user/player and metadata from the executing gaming application is delivered over a network to the back-end servers for purposes of analysis (e.g., for purposes of training the AI model), or for supporting multi-player gaming sessions. In still other embodiments, the plurality of game plays may be controlled automatically (e.g., through AI) (e.g., for purposes of self-training an AI model).

At 304, the method includes collecting at the plurality of servers training state data associated with corresponding game plays of a scenario of the gaming application. The training state data may include metadata associated with the game plays, to include controller inputs, game state, progress through the game play, results (e.g., success or failure) of the scenario, user profile information, etc. That is, the training state data includes any data that may be relevant to understanding the gaming application and/or game plays of the gaming application. Because the instances of the gaming application are executing at the back-end servers, access to the training state data is readily available without active participation of the associated players of those game plays. That is, the players may not even know that the training state data is being collected.

The training state data may include game state data that defines the state and/or condition of a gaming application at a particular point (e.g., during a game play). For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at the point corresponding to the snapshot.

Also, the training state data may include user saved data that personalizes the gaming application for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the corresponding player when playing the gaming application, game level, character attributes, character location, number of lives left, the total possible number of lives available, armor, trophy, time counter values, etc. User saved data may also include user profile data that identifies the corresponding player.

In addition, training state data may also include random seed data that is generated through AI. The random seed data may not be part of the original game code, but may be added in an overlay to make the gaming environment seem more realistic and/or engaging to the user. That is, random seed data provides additional features for the gaming environment that exists at the corresponding point in the game play of the player. For example, AI characters may be randomly generated and provided in the overlay. The AI characters are placed into the gaming environment to enhance the user's experience, and may or may not affect the game play. As an illustration, these AI characters may randomly walk the streets in a city scene. In addition, other objects maybe generated and presented in an overlay. For instance, clouds in the background and birds flying through space may be generated and presented in an overlay.

The gaming application may include one or more scenarios. A scenario may be a critical point in the gaming application (e.g., necessary to progress through the gaming application), such as combating a boss at the end of a level, or jumping over an object or obstacle that is blocking the only path to a destination, or passing an obstacle (e.g., climbing a mountain, crossing a lake or river with aggressive alligators, etc.). A scenario may be less critical, such as when completing an intermediary task in the gaming application. In these cases, the scenario may involve completing the task to obtain a reward (e.g., money, important sword, etc.). The collection of data for purposes of training an AI model may be limited to data that is related to game play during one or more scenarios of interest. In that manner, the trained AI model understands the intricacies of playing the gaming application during the scenario using data that is relevant to that scenario, and without contamination from data that may not be relevant to playing that scenario.

The scenario may be predefined, such as by the developer of the gaming application. For example, the scenario may be designed to have a high degree of difficulty, such that it is expected that many players would fail to progress through scenario. In other cases, the scenario may be discovered through analysis of the collected training state data. That is, it may become clear that a particular portion of the gaming application is difficult for players to progress through during their corresponding game plays. In that case, that portion of the gaming application may be identified as a scenario, such that training state data is collected during game plays of that identified scenario.

At 306, the method includes defining success criteria for the training state data. For example, the success criteria may be used by the deep learning engine for purposes of training the AI model. Specifically, the success criteria may be applied to define the interrelationships between the nodes of layers when the AI model (e.g., refine the weights defining the interrelationships between two nodes of different layers, etc.). For example, the success criteria may be used to differentiate training state data that are similar and that gives some insight in how to play or choose how to play the gaming application during the scenario. In a simplistic example, the scenario may involve accomplishing a task (e.g., beat a boss, navigate through an obstacle, etc.), wherein two sets of training data each describe or outline processes in how to play through the scenario (e.g., controller inputs, strategy, etc.). The success criteria may be utilized to determine which set of training state data is more successful in accomplishing the task. The more successful set of training state data may be more heavily weighted (e.g., when defining interrelationships between nodes of the AI model) than the other set of training state data that is less successful, for purposes of training an AI model relating to the scenario of the gaming application and/or game play of the scenario of the gaming application.

At 308, the method includes training an AI model for the scenario by providing the training state data and the success criteria to a deep learning engine, wherein the trained AI model provides a plurality of outputs for a plurality of inputs. Because the training state data relates to the scenario, the AI model is trained to learn everything about the scenario in the gaming application and/or game play of the scenario based on one or more success criteria. In that manner, when the AI model is given a set of inputs (e.g., game state, controller input, etc.) related to a subsequent game play of the scenario, the AI model can provide an output that may be beneficial to that game play. In one embodiment, the output may indicate a degree of success for that game play. That is, given the current condition of the game play (e.g., game state), the AI model can predict where that game play is going and predict how successful that game play may be in progressing through the corresponding scenario. Additional analysis of the output (e.g., by the analyzer 140), as well as analysis of the set of inputs (e.g., current and past sets of inputs), may provide a response to the set of inputs. In particular, an action may be performed as the output, and in response to the set of inputs. For example, if the set of inputs indicates that the game play is leading towards being unsuccessful in progressing through the scenario (e.g., via the output of the AI model), the output from the AI model may be used (e.g., by the analyzer 140) to provide a recommendation or advice on how to progress through the encountered condition during game play of the scenario of the gaming application. If the game play is associated with a remote player, the recommendation may be provided without any prompting from the remote player, such that the set of inputs is provided to the trained AI model automatically during the game play. The recommendation may help the player to successfully progress through the scenario, efficiently progress through the scenario, earn the most assets playing the scenario, accomplish tasks in the scenario that give the player the best chance to progress through a later stage or scenario in the gaming application, etc. In other embodiments, the recommendation is provided at the request of the remote player, such that in response to the request, the set of inputs is provided to the AI model.

Figures 1, 3B:
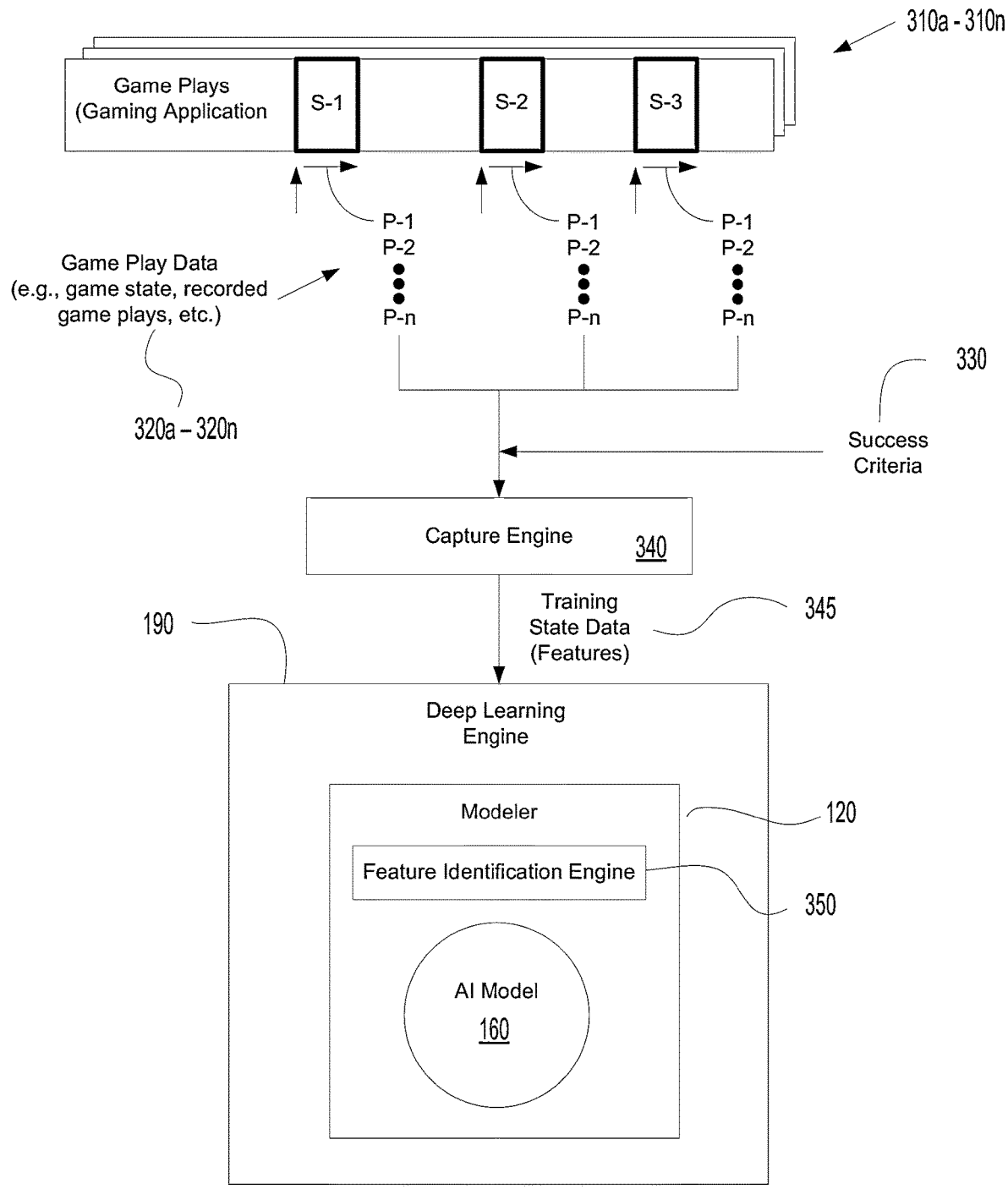
FIGS. 3B1 and 3B-2 illustrate data flow diagrams illustrating processes for training an AI model through a network of back-end servers executing instances of a gaming application, the AI model being used for provide various functionalities in relation to the gaming application and/or game plays of the gaming application, in accordance with one embodiment of the present disclosure.
Figures 2, 3B:
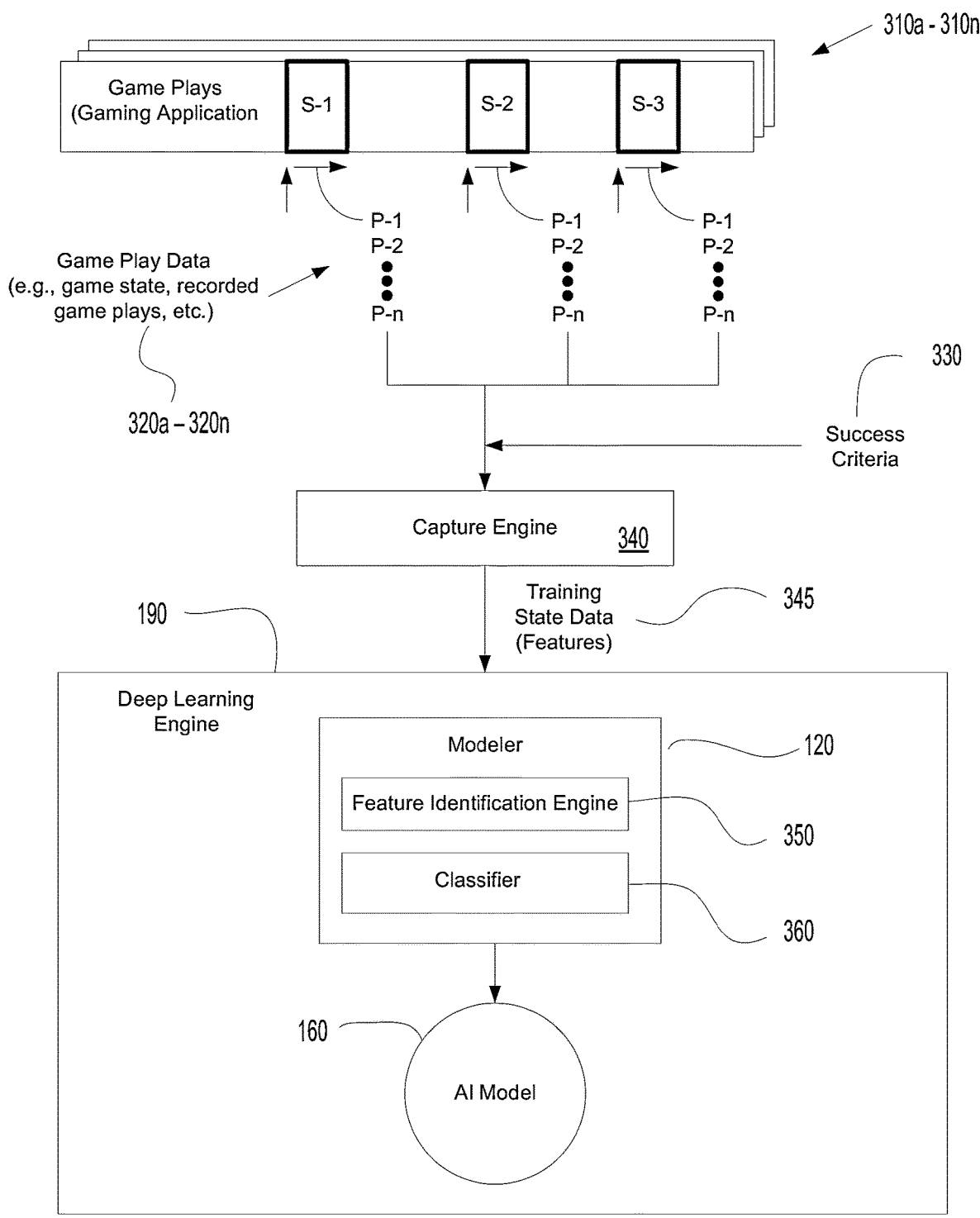

FIGS. 3B-1 and 3B-2 illustrate data flow diagrams illustrating processes for training an AI model through a network of back-end servers executing instances of a gaming application, in accordance with one embodiment of the present disclosure. As previously described, the AI model is knowledgeable about the gaming application and/or game plays of the gaming application, such that given an input (e.g., that relates to a condition of the gaming application—game state, etc.) the AI model can be used to provide various functionalities (e.g., provide assistance, etc.) in relation to the gaming application and/or game plays of the gaming application. The process of FIG. 3B-2 provides a different functionality as performed by modeler 120' when compared to the functionality as performed by modeler 120 of FIG. 3B-1, as will be described below.

As shown in FIGS. 3B-1 and 3B-2, a plurality of game plays 310 (e.g., 310a through 310n) of a gaming application is shown. Instances of the gaming application may be executing in support of the game plays, wherein the instances are executed on back-end servers, such as a game cloud system, as previously described. The gaming application may include one or more scenarios of interest. As shown, the gaming application includes a first scenario (S-1), a second scenario (S-2), and a third scenario (S-3). For example, a scenario may be rated as being difficult by the developer, or discovered through game play of the gaming application. In other examples, a scenario may be an intriguing part of the gaming application that is popular with players, such that those players would be eager to learn everything about that scenario.

In one embodiment, the plurality of game plays 310 is controlled by a plurality of players P-1 through P-n, through respective client devices. In another embodiment, the plurality of game plays 310 may be automatically controlled, such as for purposes of self-training the AI model using the plurality of back-end servers. As shown, the game plays provide various game play data 320a through 320n. The game play data may include metadata, including game state data, as previously described. For example, game state data describes the state of the game at a particular point, and may include controller input data. In addition, the game play data 320a through 320n may include recordings of the game plays 310a through 310n for purposes of extracting the metadata and/or training state data.

As shown in FIGS. 3B-1 and 3B-2, capture engine 340 captures the game play data 320a through 320n, as well as other data that may be provided, such as success criteria 330. As previously described, the success criteria may be used to differentiate training state data that are similar for purposes of training the AI model. In particular, the success criteria is used to train the AI model to include defining the interrelationships between the nodes of layers within the AI model, wherein the nodes may define features related to the gaming application and/or game play of the gaming application (e.g., controller inputs, game states, etc.). In an example, the success criteria may be utilized to determine which set of training state data is more successful, such as to define the weights of one or more paths (between nodes of one or more layers) through the AI model. In that manner, the AI model can be used to give insight (e.g., strategy) in how to play or choose how to play the gaming application during the scenario. The captured data is provided to a deep learning engine 190 as training state data 345.

As shown in FIGS. 3B-1 and 3B-2, the deep learning engine 190 includes a modeler 120 that is configured for training and/or building the AI model using the training state data 345 based one or more success criteria. The modeler 120 may implement artificial intelligence through various neural networks (e.g., convolutional, recurrent, etc.). The modeler 120 may implement AI through various algorithms, including as examples for purposes of illustration, deep learning, reinforcement learning, supervised learning, unsupervised learning, rewards based learning (e.g., through the use of success criteria, success metrics, etc.), incremental learning, etc. The deep learning engine 190 was previously introduced in FIG. 1B. In particular, the modeler 120 identifies a set of feature dependent rules that make predictions given a set of inputs (e.g., features that may define a context or condition—game state—of a gaming application) when building the AI model. The predictions may include how successful a given set of inputs may be when playing a scenario. In that manner, the AI model can be used to determine actions to be taken given the set of inputs.

As shown in FIGS. 3B-1 and 3B-2, modeler 120 of deep learning engine 190 includes a feature identification engine 350 that is configured for identifying a plurality of features of the training state data. For each game play of a corresponding scenario, the training state data includes features. For example, at a particular point in the game play, an instance of training state data may be collected, wherein the training instance includes one or more features (e.g., a set of features for the training instance), wherein features may include variables, parameters, controller inputs, game state metadata, etc.

As such, the feature identification engine 350 is configured to parse through the training state data for purposes of identifying and/or extracting features from the data. The feature identification engine 350 may also be configured to learn features. At each training cycle through the deep learning engine 190, a training instance (e.g., set of features) is provided as input, wherein the training instance may be associated with a particular point in the game play of the scenario. In this manner, the deep learning engine 190 is configured to incrementally learn about the gaming application, the scenario of the gaming application, and/or game play of the scenario of the gaming application.

As shown in FIG. 3B-1, the modeler 120 is configured to learn rules defining relationships between features and outputs (e.g., predictions, actions, etc.), wherein features may be defined within one or more nodes that are located at one or more hierarchical levels of the AI model 160 being trained. The modeler 120 builds the AI model 160 by linking the features between the layers such that a given input set of data leads to a particular output of the AI model. As such, the modeler 120 may be configured to generate the features and/or nodes of the AI model 160, as defined by rules that link the features at the various layers. For example, a rule may link (e.g., using relationship parameters including weights) one or more features or nodes through the AI model between an input and an output. That is, one or more linked features make a rule. The AI model 160 is trained and includes a set of the rules, each corresponding to a labeled or classified output. A more detailed description of the functionality of the modeler 120 is provided in FIG. 3B-2 below.

In particular, as shown in FIG. 3B-2, in the modeler 120 the identified features identified and/or extracted from the input data by the feature identification engine 130 may be delivered to a classifier 360, which is configured to learn rules defining relationships between features and outputs (e.g., predictions, actions, etc.). The features may be defined within one or more nodes that are located at one or more hierarchical levels of an AI model being trained. Each feature may be linked with one or more features at other layers, wherein one or more relationship parameters define interconnections between a first feature and other features (e.g., a second feature, a third feature, etc.) at other layers in the AI model.

For example, as shown in FIG. 3B-2 the classifier 360 is configured to determine which label or output to which a set of features (the set making a rule) belongs. That is, a rule links a given set of features which may be defined as nodes within the AI model (i.e., the nodes describing a training instance or point in the game play of the scenario of the gaming application) to a specific output, that is labeled by the classifier 360. For example, a rule may link one or more features or nodes (the links or interrelationships between features defined through one or more relationship parameters) through the AI model between an input and an output. The classifier may be configured to generate the features and/or nodes of the AI model 160, wherein the features and/or nodes are used to define the rules, as described above. The output may be associated with a label that is generated, assigned, and/or determined by the classifier 360.

More particularly, the learned rules may be learned paths and/or learned patterns (e.g., through the nodes or features of the AI model that lead to an output node) for a given set of inputs and/or input data relating to game play of a scenario of a gaming application. For example, one or more linked features and/or nodes make a rule. The trained AI model is a set of the rules and labels (i.e., outputs). In a supervised learning environment, the output is predetermined for a given set of features, and the deep learning engine learns the rule that links the set of features (e.g., through the labels) to the output. In an unsupervised learning environment, the given set of features are not automatically tied to an output, wherein the rule may be learned by looking for similarities, or clusters of data points relating to other similar sets of features. Clusters may be preferred over other clusters depending on success criteria defined for training. In either case, an existing rule for the input set of features may be matched, or a new rule may be generated for the input set of features (that is most likely similar to or an evolution of an existing rule or rules). The resulting output according to the learned rule of the AI model may predict how successful the corresponding input set of features may be when used to play the scenario of the gaming application. Further, the output from the AI model (and optionally the input set of features) may be used (e.g., via the analyzer) to determine a course of action to be taken for that particular point in the game play of the scenario (as determined by the condition or game state of the gaming application indicated by the input set of data). For example, the action may include a set of controller inputs to be suggested as a recommendation, control commands for the gaming application to respond to the inputs, etc. One or more rules may be generated for a given set of features, or similar sets of features. Depending on the corresponding success criteria or reward criteria, one rule may be preferred for a given set of features or similar set of features. For a given set of features, the output that is most successful may be chosen for the given set of features. That is, for a given set of features (e.g., input), the most successful rule (and output) is chosen to be used within the trained AI model 160, which is evidence of incremental learning.

In a simple illustration, success criteria may be defined by earned points, wherein the path (e.g., linked labels) generating the most points is more successful. In another example, success criteria may be related to the level of a life bar of the player's character or an opponent, as is further described in FIG. 3C-1. Other success criteria may be defined based on the player. For example, by identifying an expert through one or more success criteria, their corresponding game plays may be targeted for use as training state data, and generally used for learning the best actions to take for a given state or condition of a game play of a scenario of a gaming application. In that manner, success criteria may be defined to determine skill level of the player, to include how quick is the players' response time, how accurate is the player in targeting one or more targets (e.g., generally a skilled player has a fast trigger and moves from one target to another quickly, decisively, and accurately), how quick is the period between controller inputs, etc.

As shown in FIGS. 3B-1 and 3B-2, the modeler 120 builds and/or outputs the trained AI model 160, which links the learned paths and/or learned patterns (e.g., linking labels of the AI model) to a given set of inputs and/or input data relating to game play of a scenario of a gaming application. The AI model 160 can be later used to provide one or more functionalities related to the gaming application and/or game play of the gaming application. That is, given a set of inputs that may indicate a condition of a subsequent game play by a player, the resulting output of the trained AI model 160 can be used (e.g., via the analyzer) to predict and/or determine the best course of action to be taken for that particular point in the game play of the scenario as defined by the corresponding set of input data. For example, a player may be playing the scenario of the gaming application after the AI model 160 has been trained. The player is also encountering difficulty in progressing through the scenario, which may be reflected in the output of the AI model. New and subsequent input state data (e.g., game state) may be related to any data related to that particular point in a game play of that player (where difficulty is experienced). That input state data for the scenario is received and provided to the AI model via the deep learning engine 190, wherein the AI model may predict as an output how successful the game play will be when playing the scenario given the given condition of the gaming application. The output from the AI model can be analyzed and used to perform various functionalities related to the gaming application and/or the game play of the gaming application. For example, the output may be analyzed to determine the best course of action to be taken for that particular point in the game play of the scenario. An action may be performed based on the output. For example, the trained AI model 160 may provide a recommendation to the player to advance his or her game play.

Other functionalities may also be determined and generated based on the output of the AI model 160 for a given input set of data, wherein the functionalities are manifested in the form of an output or action. That is, input state data is received during a first game play of the scenario, and provided as input to a deep learning engine. The deep learning engine applies the AI model to the input state data.

Figure 4A:
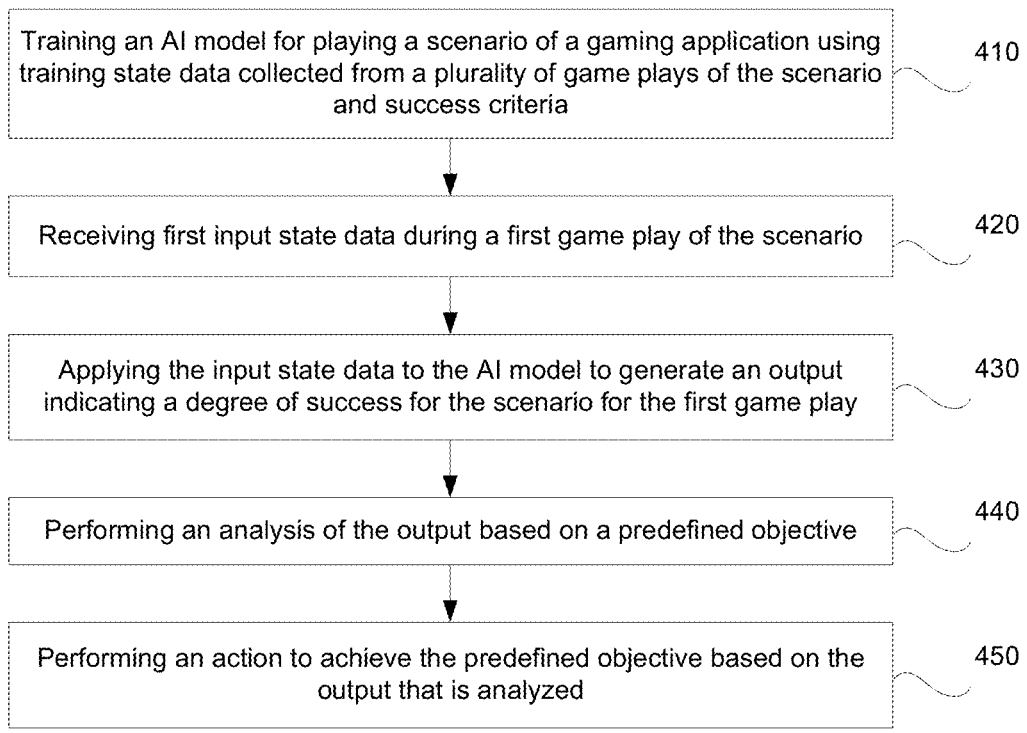
FIG. 4A is a flow diagram illustrating a method for applying an AI model configured to understand how to play a gaming application, the AI model being used for provide various functionalities in relation to the gaming application and/or game plays of the gaming application, in accordance with one embodiment of the present disclosure.
Figure 4B:
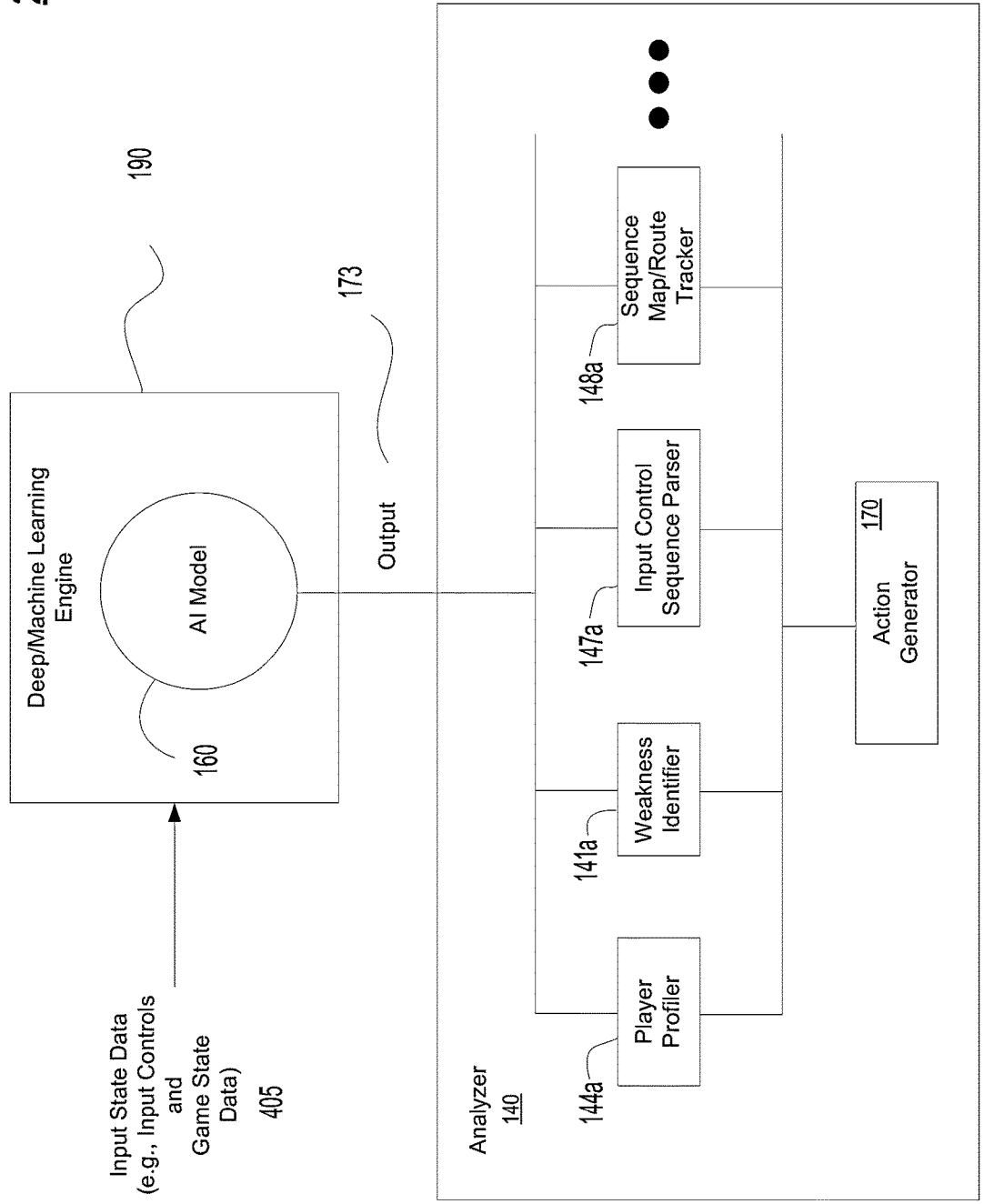
FIG. 4B is block diagram of AI processor engine that is configured for applying an AI model configured to understand how to play a gaming application, the AI model being used for provide various functionalities in relation to the gaming application and/or game plays of the gaming application, in accordance with one embodiment of the present disclosure.

An action is performed based on an analysis of the output of the AI model, wherein the action is performed in response to the input state data. FIGS. 4A-4B illustrate the application of the AI model for a given game play of a gaming application. FIGS. 5A-5F provide various illustrations of different actions or responses that can be performed depending on the objective predefined. In particular, the AI model, as implemented through the deep learning engine 190, matches a given input state data to one or more rules (each rule providing linked or interconnected nodes and/or features) defined within the trained AI model. Each rule is associated with an output. A success criteria may be applied to generate the rule. In addition, an analyzer 140 takes the output and performs additional analysis to determine the appropriate action in relation to the corresponding input data. For example, when the rule is satisfied with respect to the success criteria for a given set of input state data, a corresponding action may be identified and/or performed.

Figures 1, 3C:
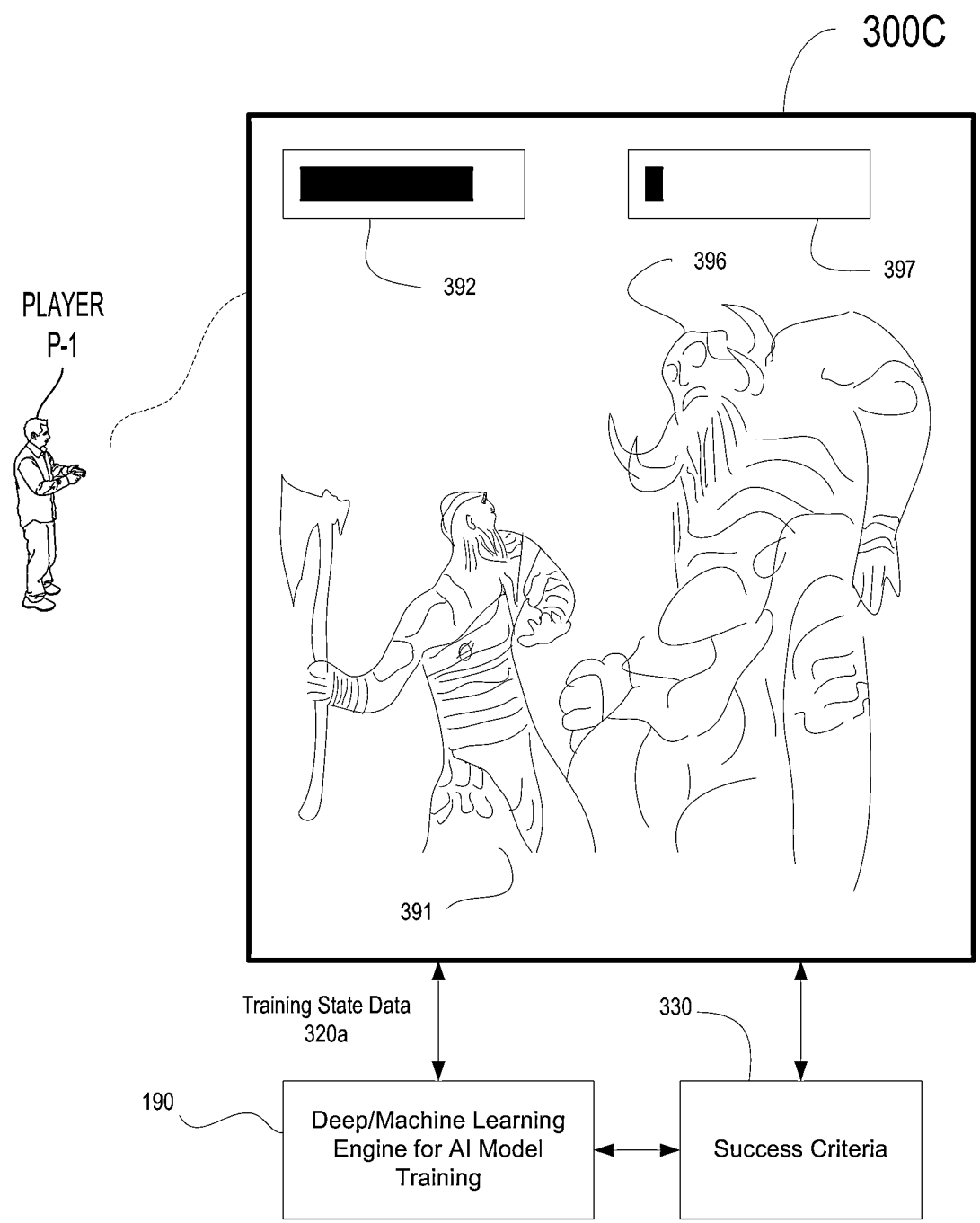
Figures 2, 3C:
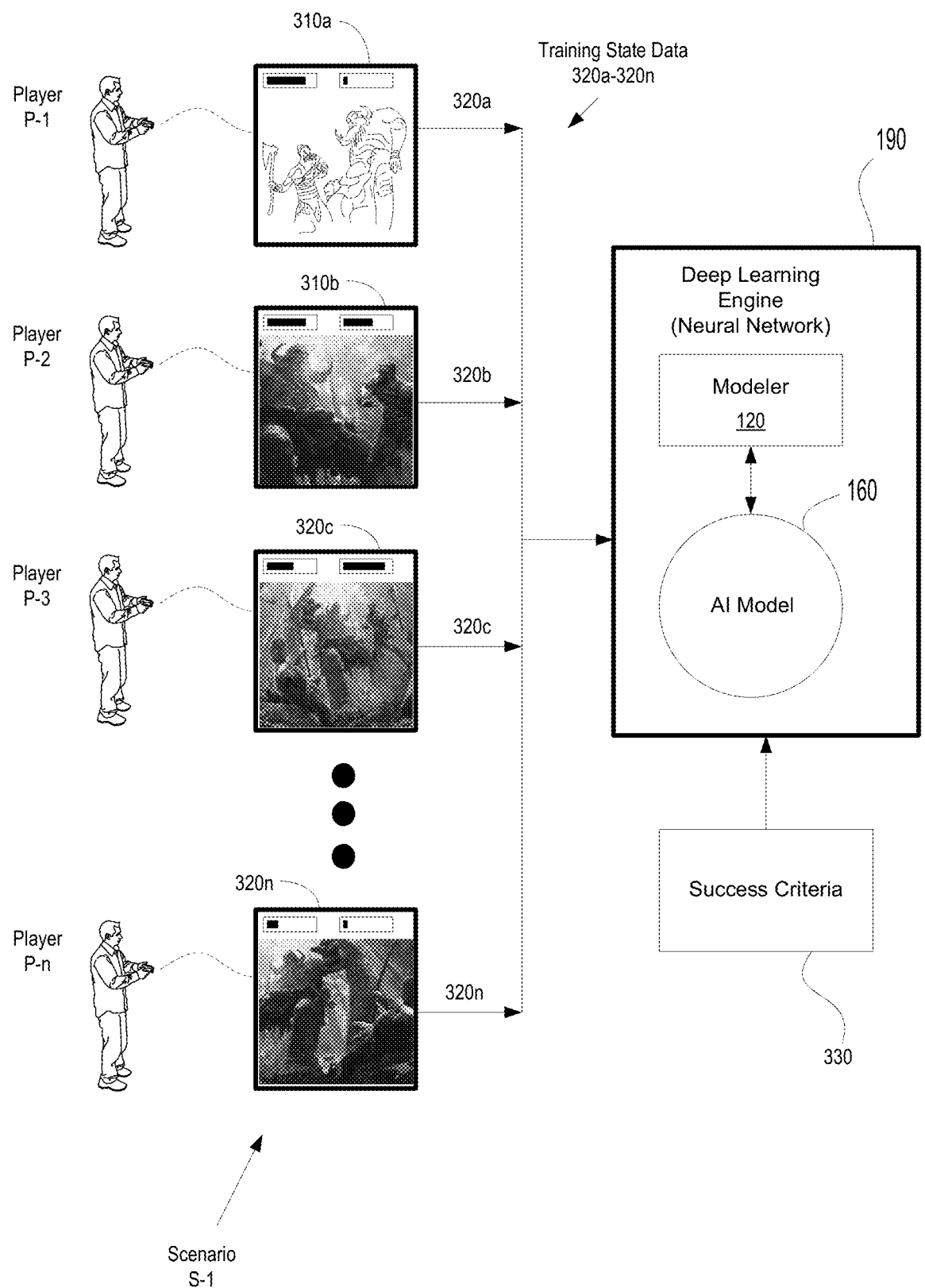

FIG. 3C-1 is a screen shot 300C of a game play of a gaming application and illustrates one type of success criteria that may be used to train the AI model that understands how to play the gaming application, in accordance with one embodiment of the present disclosure. In particular, player P-1 controls the game play. As shown, screen shot 300C shows a frontal view of the battle between Kratos 391 and the enemy 396. In the "God of War" gaming application, Kratos is a Spartan warrior of Greek mythology, who is tasked with killing Ares, the God of War. In the game play, a player may control Kratos 391. Training state data 320a from the game play associated with the screen shot 300C is fed to the deep and/or machine learning engine 190 for purposes of training the AI model, previously described. In addition, success criteria 330 is supplied to the deep and/or machine learning engine 190, wherein the success criteria is used by the deep learning engine 190 to train the AI model. For example, the success criteria may be used to differentiate paths through the AI model (where the paths traverse nodes in the AI model). In embodiments, one or more success criteria may be defined for use in training the AI model. For example, success criteria may include earning the most points, earning the most assets or most powerful assets or a critical asset, etc.

In one example, the success criteria 330 may be defined by whether a life bar 397 of the enemy 396 becomes low during the game play, wherein the life bar indicates health of the corresponding character. Also, the life bar 392 indicates the health of Kratos 391 during the game play. As shown, the life bar 397 of the enemy is extremely low, and may indicate that the game play is successful or has a high degree of success. In another example, the success criteria may be more sophisticated and is defined by how quickly the life bar 397 of enemy 396 is depleted. If the life bar 397 is quickly depleted, this indicates that the game play is being controlled by a highly skilled player. For example, the highly skilled player understands how to battle enemy 397, and knows the sequences of controller inputs used to defeat the enemy 396, and has the skill and/or ability to implement those sequences quickly and accurately (e.g., without deviation). During training of the AI model, using success criteria that focuses on how quickly the life bar is depleted may differentiate successful inputs over less successful inputs, and help identify controller input sequences to be used during a particular condition or game state of the game play that would be successful if implemented by another player.

FIG. 3C-2 is an illustration of the collection of training state data from a plurality of game plays, wherein a plurality of instances is executing on a plurality of servers in support of the game plays, in accordance with one embodiment of the present disclosure. A plurality of game plays 310 (e.g., 310a through 310n) of a gaming application is shown. The plurality of game plays 310 is controlled by a plurality of players P-1 through P-n, through respective client devices. As shown, the game plays provide various game play data 320a through 320n, of which extracted data may be used as training state data 345. The game play data may include metadata, including game state data, as previously described. Each of the game plays is playing scenario 1 (S-1) of the gaming application, wherein each game play is unique and has a unique outcome. That is, each game play may be associated with a measured degree of success of progressing through scenario S-1. That degree of success may be measured in part using success criteria 330, wherein the success criteria 330 may be used by the modeler 120 of the deep and/or machine learning engine 190 to train the AI model 160, as previously described. For example, success criteria may be used to differentiate training state data that are similar for purposes of training the AI model.

With the detailed description of the various modules of the system 100A and system 200B, flow diagram 400A of FIG. 4A discloses a method for applying an AI model that knows everything about the gaming application and/or game plays of the gaming application based on one or more success criteria (e.g., understands how to play a gaming application), the AI model being used for provide various functionalities in relation to the gaming application and/or game plays of the gaming application, in accordance with one embodiment of the present disclosure. Flow diagram 400A may be implemented within a back-end server (e.g., within the game cloud system 201 in combination with a deep learning engine 190), previously described.

In particular, at 410, the method includes training an AI model from a plurality of game plays of a scenario of the gaming application. For example, the AI model is trained for playing the scenario of a gaming application using training state data collected from a plurality of game plays of the scenario and associated success criteria of each of the game plays. That is, the AI model is trained to learn the intricacies of the gaming application and/or the intricacies of playing the gaming application or a scenario of the gaming application.

In one embodiment, the AI model is trained using training state data collected across a plurality of game plays of the gaming application, wherein the plurality of game plays is controlled by a plurality of players via a plurality of client devices. For example, a plurality of servers may be executing a plurality of instances of the gaming application, wherein the instances support the plurality of game plays. Training state data is collected at the plurality of servers, wherein the training state data is associated with corresponding game plays of the scenario. For example, the training state data may include metadata associated with the game plays, to include controller inputs, game state defining the state and/or condition of the gaming application at a particular point during a game play, progress through the game play, results (e.g., success or failure) of the scenario, user profile information, etc., as previously described. That is, the training state data includes any data that may be relevant to understanding the gaming application and/or game plays of the gaming application.

In addition, one or more success criteria is defined for the training state data. For example, success criteria is used to train the AI model that understands how to play the gaming application. For example, the success criteria may be used to define favorable links between nodes of the AI model, or to define favorable paths through the nodes of the AI model for a given set of input data. The success criteria and the training state data are provided to a deep learning engine to train the AI model.

At 420, the method includes receiving first input state data during a first game play of the scenario. In one embodiment, the first game play occurs after training the AI model. That is, the first game play is not used for training the AI model. In another embodiment, the first game play may occur during training, such that the first game play is used for training the AI model (e.g., self-training mode). In still another embodiment, the first game play may not initially be used for training the AI model, and is used primarily for determining an appropriate action to be taken given the first input state data. Thereafter, the first game play (e.g., the first input state data) may be used to refine the AI model through additional training.

At 430, the method includes applying the first input state data to the AI model to generate an output. In one embodiment, the output may indicate a degree of success for the scenario for the first game play. That is, the output may predict how successful the first game play will be in progressing through the scenario.

At 440, the method includes performing an analysis of the output based on a predefined objective. In addition, the set of inputs (e.g., current and past sets of inputs) may also be analyzed. Depending on the predefined objective, the analysis may produce an action to be performed for a particular point in the corresponding game play of the scenario (as determined by the condition or game state of the gaming application indicated by the input set of data). For example, if the predefined objective is to provide assistance, the analysis may produce a recommendation or advice on how to progress through the encountered condition during game play of the scenario of the gaming application. If the predefined objective is to provide coaching, the analysis may determine a weakness of the player, and provide tutorial sessions for the player to address the weakness. Other predefined objectives are supported, such as to provide gaming support, provide parity in game plays, to automatically train the AI model, to find flaws in the gaming application, to automatically test the gaming application, etc.

As such, at 450, the method includes performing the action to achieve the predefined objective based on the output that is analyzed. FIGS. 5A-5F provide various illustrations and examples of different actions or responses that can be performed depending on the objective predefined.

FIG. 4B is block diagram of AI processor engine 210 of FIG. 2B that is configured for applying an AI model that is configured to understand how to play a gaming application, the AI model being used for provide various functionalities in relation to the gaming application and/or game plays of the gaming application, in accordance with one embodiment of the present disclosure. As shown, the AI processor engine 210 includes the deep learning engine or machine learning engine 190 that is configured to train and/or apply the AI model 160, wherein the AI model 160 is configured to provide an output for a given input. The AI processor engine 210 also includes an analyzer for using the output from the AI model 160 to determine a response for the input.

In particular, input state data 405 is provided as input to the deep learning engine 190 that is configured to implement the AI model 160. The input state data may be associated with game play of the gaming application, to include controller inputs, game state data, user data, success criteria, etc., as previously described. The input state data 405 may be provided after the AI model 160 is trained, in some embodiments. In other embodiments, the input state data 405 may be provided during the training of the AI model 160 (e.g., self-training the AI model). As previously described, the AI model 160 generates an output 173 for the given input state data 405. For example, the output may indicate how successful the game play may be in progressing through a scenario of the gaming application. The output may be analyzed by the analyzer 140 to provide various functionalities in relation to the game play of the gaming application. The analyzer 140 determines the appropriate action or response depending on a predefined objective, as previously described (e.g., coaching, providing assistance, etc.). That is, the AI model 160 may be used by the analyzer 140 to determine what is needed to direct the game play to a successful end during the scenario. As such, the analyzer 140 may determine and perform an action depending on the predefined objective for a given input state data. In that manner, the analyzer through the use of the AI model 160 can provide various functionalities related to the gaming application and/or the game play of the gaming application.

As shown, as part of the analysis the analyzer 140 may perform one or more functions. For example, the player profiler 144a of the analyzer 140 is configured to perform profiling of the player playing the gaming application (e.g., determine skill level of the player). The weakness identifier 141a of the analyzer 140 is configured to identify a weakness in the gaming ability of the player. The input control sequence parser 147a of the analyzer 140 is configured to determine the sequence of controller inputs used by the player to control the game play. The sequence map and/or route tracker 148a of the analyzer 140 is configured to track the progress of the game play, to include tracking the progress through a gaming environment. For example, the tracker 148a is configured to track routes taken in the gaming environment, or to build a map of the gaming environment, or to build a node map of the game play indicating progress through the gaming application. Still other modules are supported that provide an analysis of the output of the AI model for a given input state data 405.

The analyzer 140 is further configured to determine and perform an action by the action generator 170 in response to the analysis of the output determined in response to the given input state data 405. The action is determined and performed depending on the predefined objective. For example, the action may provide services to the player playing the gaming application (e.g., provide a profile of a player playing the gaming application, providing recommendations to a player during game play of a gaming application by the player wherein the recommendation may be structured in consideration of the user profile, finding weaknesses of the player, provide services to address those weaknesses, training the player, providing a bot opponent to the player, take over game play for the player, etc.). The action may also provide services to the game developer or other entity, such as finding flaws in the gaming application, building equal teams using player profiles that are competing against each other in the gaming application such as in a multi-player online game, automatically training the AI model through auto-play, explore the gaming environment of the gaming application to discover flaws, etc. FIGS. 5A-5F provide various illustrations of different actions or responses that can be performed depending on the objective predefined.

Figure 5A:
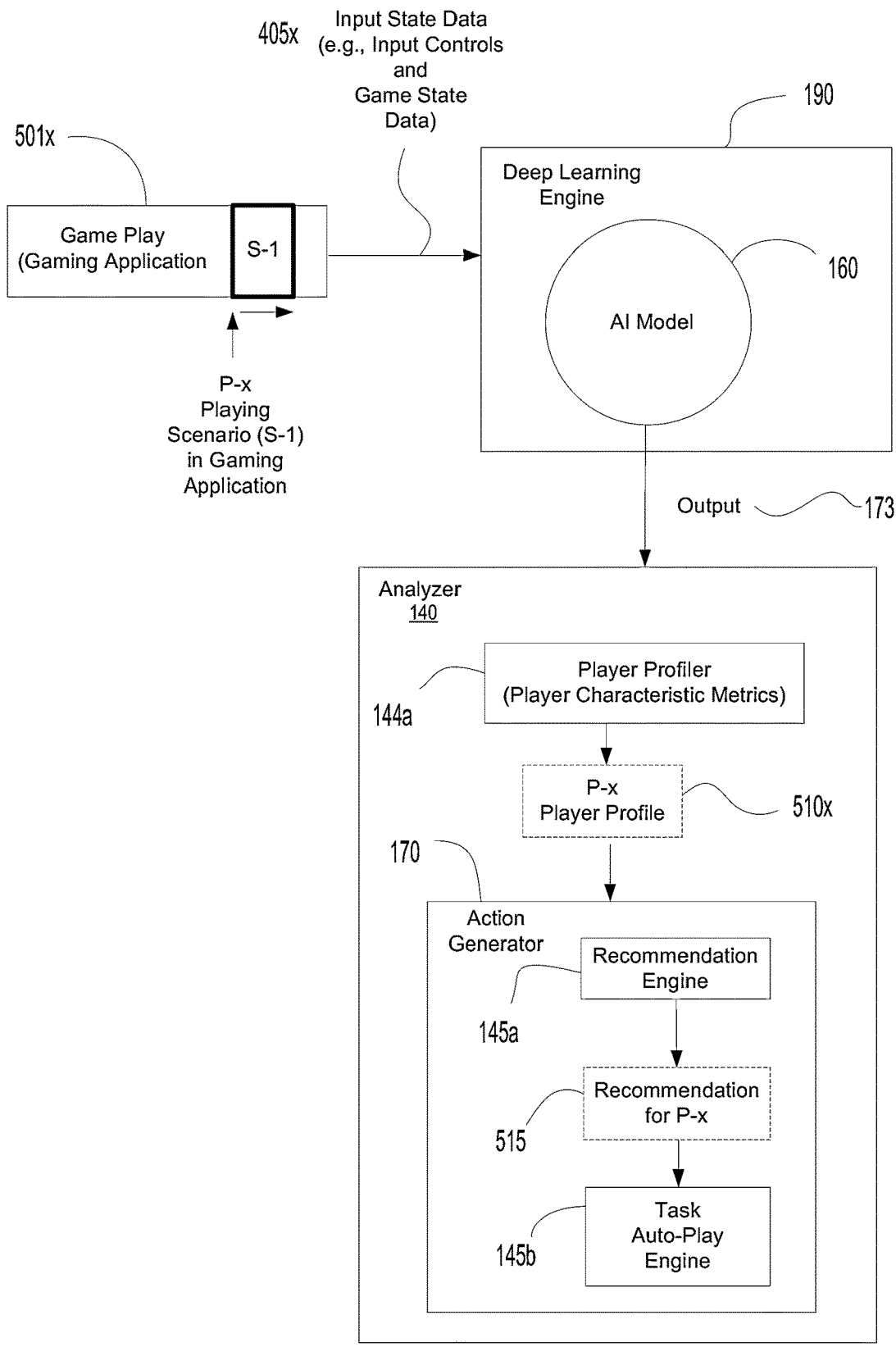
FIG. 5A illustrates a data flow diagram illustrating a process for providing recommendations to a player playing a gaming application, the recommendation provided through an AI model trained through a network of back-end servers executing instances of a gaming application, in accordance with one embodiment of the present disclosure.

In particular, FIG. 5A illustrates a data flow diagram illustrating a process for providing recommendations to a player playing a gaming application, the recommendation provided through an AI model 160 trained through a network of back-end servers executing instances of a gaming application, in accordance with one embodiment of the present disclosure. A game play 501x of a gaming application is shown. The game play may be controlled by a player P-x through a corresponding client device, wherein an instance of the gaming application is executing at a back-end server of a streaming gaming service (e.g., cloud game system), as previously described. In other embodiments, the gaming application may be executing locally on the client device, and metadata is delivered to a back-end server for AI model support. The game play 501x is occurring during scenario S-1.

Input state data 505x from the game play 501x is provided to the analyzer 140 that is configured to analyze the output of the trained AI model 160, wherein the AI model 160 is implemented through the deep learning engine 190 (in an application phase and not a learning phase). The input state data 505x is received after the AI model 160 is trained, and as such may not be part of the training state data used for training the AI model, previously described. The AI model 160 is configured to provide an output 173, and the analyzer 140 is configured to perform or provide an action to be performed based on an analysis of the output 173.

In particular, the action generator 170 of the analyzer 140 includes a recommendation engine 145a that is configured to provide a recommendation to a player during game play of a gaming application by the player. For example, the predefined objective may be to provide gaming support to player P-x, as implemented through the analyzer 140. The recommendation may be provided in response to a condition (e.g., game state) in the game play, such as when the player is having difficulty navigating through a particular scenario of the gaming application. In one embodiment, the analyzer 140 can determine that the player is struggling by determining that the first input state data, or the features in the first input state data does not satisfy a corresponding success criteria. The success criteria may provide an indication on how successful the game play will turn out, and in particular how successful that portion of the game play will turn out. For example, the success criteria may indicate how many points are accumulated during the scenario. When the analyzer 140 determines from the output of the AI model 160 that the first input state data does not meet the success criteria, then a recommendation 515 may be provided, as an action, to the client device of the player P-x.

In one embodiment, the recommendation may take into account the user/player profile 510x of the player P-x (e.g., consider the skill level of the player), wherein the player profiler 144a may analyze the output data from the trained AI model 160 and/or the input state data to determine the user profile 510x (e.g., how the player reacts to the gaming application during the scenario, skill level, and other player characteristic metrics) for the scenario. That is, the recommendation reflects the skill of the player P-x. In other embodiments, the user profile 510x may be determined through historical game play of the subject gaming application, as well as other gaming applications. For example, if the user profile 510x indicates that the player is an expert gamer, then the recommendation 515 for player P-x may provide small hints without too much detail. On the other hand, if the user profile 510x indicates that the player P-x is a beginning gamer, then the recommendation 515 may provide detailed instructions for the player to follow.

In one embodiment, the recommendation 515 may include a query asking if the player P-x would like to engage an auto play feature. If yes, the task auto play engine 145b is configured to take over the game play of player P-x. In that manner, the task auto play engine 145b automatically (and with success) performs the scenario or a task within the scenario in the gaming application.

Figure 5B:
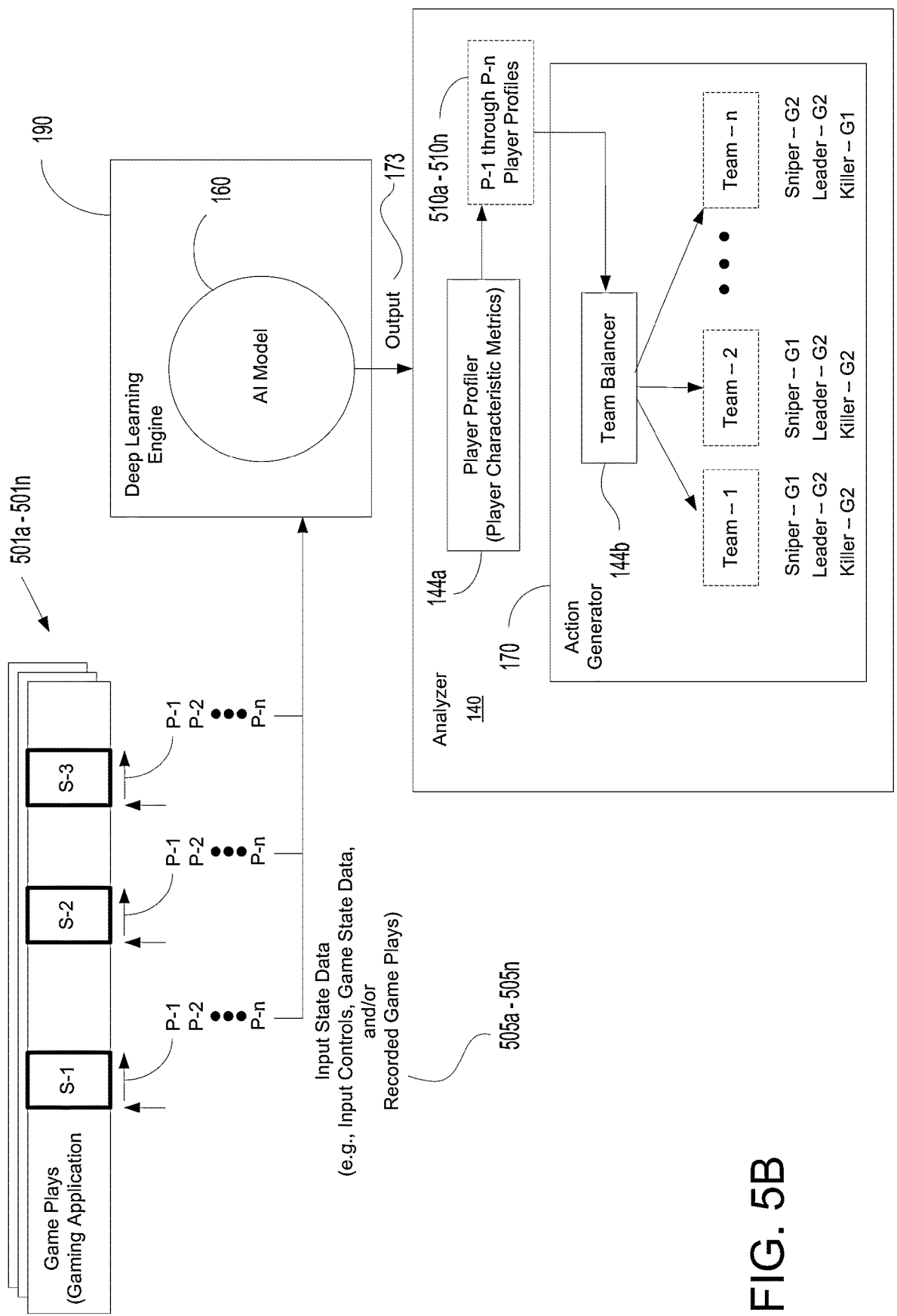
FIG. 5B illustrates a data flow diagram illustrating a process for balancing teams of players playing a gaming application using player profiles determined through an AI model trained through a network of back-end servers executing instances of a gaming application, in accordance with one embodiment of the present disclosure.

FIG. 5B illustrates a data flow diagram illustrating a process for balancing teams of players playing a gaming application using player profiles determined through an AI model trained through a network of back-end servers executing instances of a gaming application, in accordance with one embodiment of the present disclosure. A plurality of game plays 501 (e.g., 501a through 501n) of a gaming application is shown. The game plays may be controlled by a plurality of players P-1 through P-n through corresponding client devices. As previously described, instances of the gaming application are executing on back-end servers of a streaming gaming service (e.g., cloud game system), as previously described. In other embodiments, the gaming application may be executing locally on the client device, and metadata is delivered to a back-end server for AI model support. The game plays 501a-501n may be occurring during one or more scenarios S-1, S-2, and S-3, for example.

Input state data 505a through 505n from the game plays 501a through 501n is provided to the analyzer 140 that is configured to analyze the output of the trained AI model 160, wherein the AI model 160 is implemented through the deep learning engine 190 (in an application phase and not a learning phase). In one embodiment, the plurality of input state data 505a-505n is received during a second plurality of game plays of a scenario of a gaming application, wherein the game plays may be conducted after training the AI model. The second plurality of game plays is controlled by a plurality of players, and wherein the plurality of input state data includes a plurality of player characteristic metrics of the plurality of players. The plurality of input state data is applied to the AI model to generate a plurality of outputs indicating a plurality of degrees of success for the second plurality of game plays of the scenario. In addition, the plurality of outputs is analyzed to determine a plurality of player profiles based on the plurality of player characteristic metrics. The AI model 160 is configured to provide an output, and the analyzer 140 is configured to perform or provide an action to be performed based on that analysis of the output. In particular, the analyzer 140 is configured to build balanced teams of players from the plurality of players based on corresponding player profiles to achieve a predefined objective.

During the analysis, the analyzer 140 may perform user profiling, such as by the player profiler 144a. In particular, the output from the trained AI model 160 is provided to player profiler 144a that is configured to provide profiles of the players P-1 through P-n playing the gaming application. The player profiles 510a through 510n may be limited to game play of a particular scenario of the gaming application (e.g., profile determines or predicts how a corresponding player reacts to the gaming application during the scenario, the skill level of the corresponding player, etc.). For example, player profiles may be defined based on a plurality of player characteristic metrics, wherein each player profile includes one or more corresponding player characteristic metrics. The input state data may be received during game plays of the gaming application by the players. The input state data including a plurality of player characteristic metrics of the plurality of players. The input state data is also applied to the AI model 160 to determine an output, as previously described. The player profiler 144a analyzes the output 173 and/or the input state data 505a-505n to determine corresponding player profiles of corresponding players. For example, a corresponding player profile is based on corresponding player characteristic metrics provided as an input to the trained AI model. For example, player characteristic metrics may include: accuracy of the player; or speed of generating a sequence of input control data by a corresponding player; or reaction time of the corresponding player when responding to an event in the scenario; or consistency of the corresponding player; or transition time of the corresponding player between a first target and a second target, etc. In other embodiments, a corresponding player profile may be determined through historical game play of the subject gaming application, as well as other gaming applications, a previously described.

Also, the action generator 170 of the analyzer 140 includes a team balancer module 144b that is configured to build teams (e.g., teams that are competing against each other in the gaming application) that are fairly balanced using player profiles according to a predefined objective. For example, the predefined objective may be to provide parity in game plays (e.g., in a massively multi-player online gaming application—MMO), as implemented through the analyzer 140. For example, based on the player profiles 510a through 510n, the team balancer 144b is configured to build teams (e.g., teams that are competing against each other in the gaming application) that are fairly balanced. In that manner, the game plays of the gaming application between the two teams will be fair, engaging, and worthwhile to the players on each team. For example, balanced teams will help to avoid blowout games. Consider player profiles that are further compartmentalized into two groups (G1 and G2) based on skill levels in one or more categories. It is desirable to spread players, and/or skills of players of each group evenly throughput all teams (e.g., team-1 through team-n). Each team in a gaming application centered on combat includes one or more positions, including a leader, a sniper, a trained killer (e.g., hand to hand combat). In one illustration, you can group all the skill positions and then evenly spread them out between the teams. In the illustration, the leader is excluded, and for simplicity all leaders are selected from a single group G-2, such that all teams have equally strong leaders. It is assumed that all other skilled positions are valued equally. That is, each team should be made up of a number of skilled positions with equal numbers of players taken from each group G1 and G2. For example, each team includes on player from group G1, and one player from group G2 (excluding the leader). As shown, team-1 and team-2 each includes one player from group G1 (the sniper) and one player from G2 (e.g., the killer). Also, team-3 includes one player from group G1 (the killer) and one player from G2 (e.g., the sniper). As such, each team is balanced according user profiles (e.g., skill level).

Figure 5C:
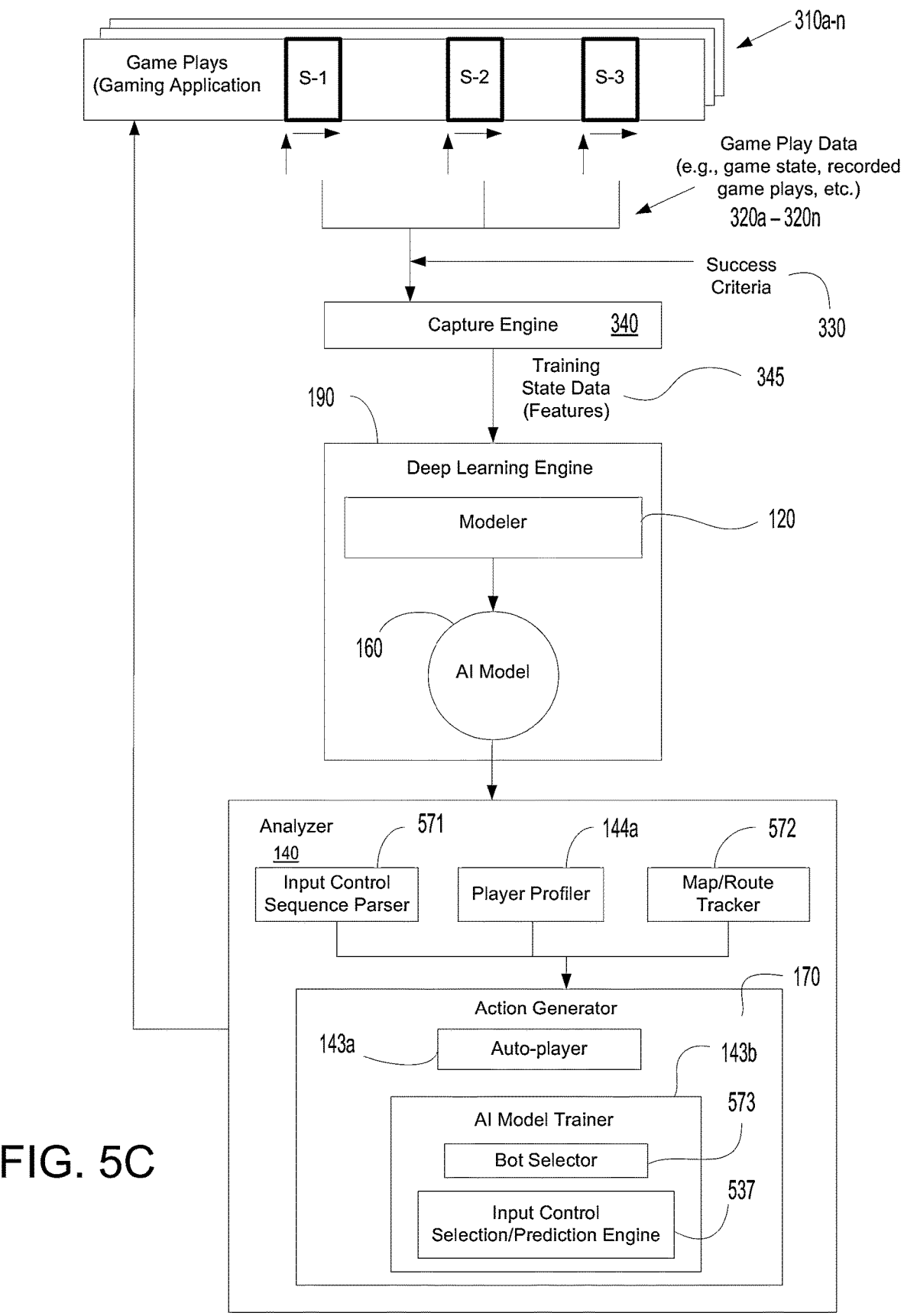
FIG. 5C illustrates a data flow diagram illustrating a process for training an AI model through auto play directed by the AI model, wherein the AI model is trained through a network of back-end servers executing instances of a gaming application, in accordance with one embodiment of the present disclosure.

FIG. 5C illustrates a data flow diagram illustrating a process for training an AI model through auto play directed by the AI model 160, in accordance with one embodiment of the present disclosure. As previously described, the AI model 160 is trained through a network of back-end servers executing instances of a gaming application. A plurality of game plays 310a through 310n of a gaming application is shown. As previously described, game play data 320a through 320n is produced from the game plays 310a through 310n. In one embodiment, the plurality of game plays is controlled by the AI model 160 during training. In that manner, the input state data is generated by the analyzer 140 using data from the AI model 160, wherein the input state data is provided as a previous action by the analyzer 140 during training. The game play data may include metadata, including game state data that describes the state of the game at a particular point, and may include controller input data, and may include recordings of the game plays 310a through 310n for purposes of extracting the metadata and/or training state data. Capture engine 340 captures the game play data 320a through 320n, as well as other data that may be provided, such as success criteria 330, as previously described. Success criteria may be used to differentiate training state data that are similar for purposes of training. That is success criteria may be used by the deep learning engine 190 to train the AI model 160. Training state data 345 is provided to the deep learning engine 190. The function of the deep learning engine 190 was described in relation to FIGS. 3B1 and 3B-2, and is equally applicable to the deep learning engine 190 shown in FIG. 5C. Not all components of the deep learning engine 190 are shown in FIG. 5C for simplicity. Generally, the deep learning engine 190 includes a modeler 120 that is configured for training and/or building the AI model 160 using the training state data 345 and success criteria 330. The modeler 120 may implement artificial intelligence through various neural networks (e.g., convolutional, recurrent, etc.). In particular, the modeler 120 identifies a set of feature dependent rules that make predictions and/or determine actions to be taken given a set of inputs (e.g., features that may define a context or condition—game state—of a gaming application). For example, the output of the AI model 160 may predict the success of a given set of input data (e.g., defining a condition of a game play of a gaming application) in progressing through a scenario of the gaming application. The set of rules connecting features and/or nodes make up the AI model 160.

As shown, the deep learning engine acts in both the learning and application phases. In particular, the game plays 310 are automatically executed, such as by the AI model 160. In that manner, the AI model 160 is self-trained. Specifically, the analyzer 140 includes an input control sequence parser 571, a player profiler 144a, and a map/route tracker 572, each of which is previously introduced. For example, the input control sequence parser 147a is configured to determine the sequence of controller inputs used by the player to control the game play. The sequence map and/or route tracker 148a of the analyzer 140 is configured to track the progress of the game play, to include tracking the progress through a gaming environment. The player profiler 144a of the analyzer 140 is configured to perform profiling of the player playing the gaming application (e.g., determine skill level of the player).

In addition, the action generator 170 of the analyzer 140 includes an auto player 143a that is configured to auto play the gaming application, such as for purposes of automatically training the AI model, as directed by the AI model trainer 143b, according to the predefined objective. For example, the predefined objective may be to automatically train the AI model 160. Specifically, the analyzer 140 includes the auto player 143a that is configured to auto play the gaming application, as directed by the AI model trainer 143b. For example, for a given set of training state data, such as for a training instance, a learned output of the AI model 160 may be analyzed by the analyzer 140 to determine the next set of controller inputs for controlling the corresponding game play. In particular, the bot selector and input control selection/prediction engine 537 of the AI model trainer 143b combined are configured to determine the next set of controller inputs depending on the objective. For example, a bot may be selected that is optimized for getting the through the game with the best success and efficiency, or exploring the different permutations of the gaming application, etc. Depending on the objective, the input control selection/prediction engine 537 is configured to predict what the next set of controller inputs would be given the objective and the selected bot. The controller inputs are delivered back to the auto-player 143a, which then sends the controller inputs to the corresponding instance of the gaming application supporting a corresponding game play. In that manner, by utilizing a bank of back-end servers for executing instances of the gaming application for corresponding game plays 310a-310n, the training state data 345 may be automatically generated quickly and efficiently.

In one embodiment, for the first input state data, a plurality of sets of input controls or controller inputs may be determined to be played subsequent to the first input state data. A first set of input controls is selected that is predicted to satisfy the success criteria, and predicted to have a highest degree of success among the plurality of sets of input controls. In that manner, the first set of input controls can be delivered as the action to a corresponding instance of the gaming application for execution.

Figure 5D:
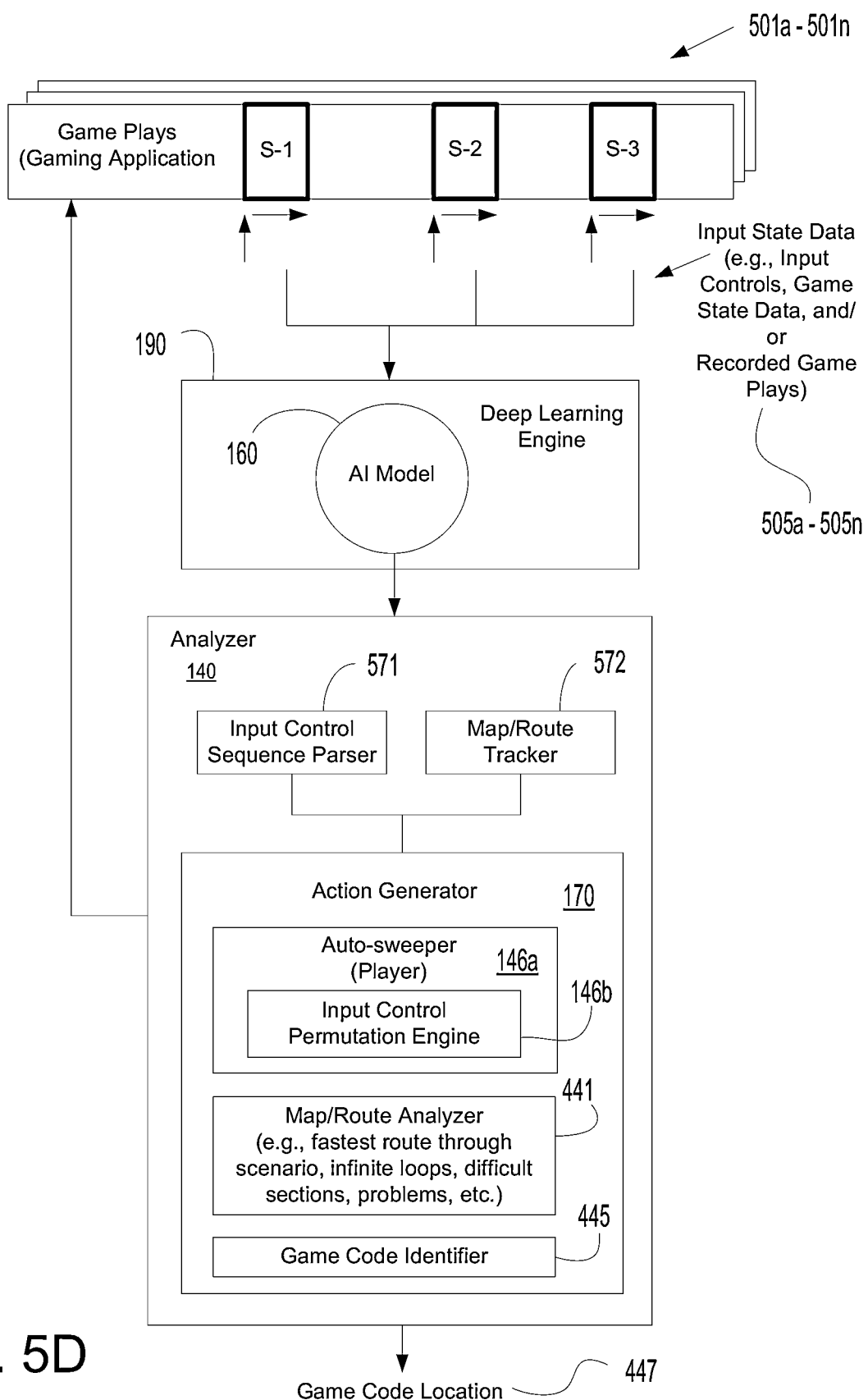
FIG. 5D illustrates a data flow diagram illustrating a process for automatically sweeping through a gaming application using an auto player directed by an AI model that is trained through a network of back-end servers executing instances of the gaming application, in accordance with one embodiment of the present disclosure.

FIG. 5D illustrates a data flow diagram illustrating a process for automatically sweeping through a gaming application using an auto-sweeper/player 146a directed by an AI model 160 that is trained through a network of back-end servers executing instances of the gaming application, in accordance with one embodiment of the present disclosure. A plurality of game plays 501 (e.g., 501a through 501n) of a gaming application is shown. The game plays may be controlled automatically, such as through a AI model 160. In that case, the AI model 160 may be configured to provide the next input state data (e.g., controller input that is used to generate game state and other input state data). Instances of the gaming application may be executing on back-end servers of a streaming gaming service (e.g., cloud game system. The game plays 501a-501n may be occurring during one or more scenarios S-1, S-2, and S-3, for example. Input state data 505a through 505n from the game plays 501a through 501n is provided to the analyzer 140 that is configured to analyze the output of the AI model 160. The deep learning engine 190 implements the AI model 160 (in an application phase and not a learning phase). The AI model 160 is configured to provide an output, and the analyzer 140 is configured to perform or provide an action to be performed based on that analysis of the output.

In particular, the game plays 310 are automatically executed, such as by the AI model 160. For example, the predefined objective may be to automatically test the gaming application after the AI model has been trained. For instance, the AI model may have been previously automatically self-trained and the AI model may now be used to test the gaming application. In another embodiment, the auto-sweep feature is performed during training. Specifically, the analyzer 140 includes an input control sequence parser 571 and a map/route tracker 572, each of which is previously introduced. For example, the input control sequence parser 147a is configured to determine the sequence of controller inputs previously tested. The sequence map and/or route tracker 148a of the analyzer 140 is configured to track the progress of the game play during testing, to include tracking the progress through a gaming environment.

In one embodiment, first input state data is generated by the AI model as a previously action taken during training. During analysis of the output of the AI model, different permutations are then determined for responding to the first input state data. For example, each permutation includes a unique set of controller inputs to be taken. Thereafter, one or more actions are taken, such as executing the different permutations. In that manner, the system may be configured to discover any anomaly in playing the gaming application.

In particular, the action generator 170 of the analyzer 140 includes the auto sweeper engine/player 146a that is configured to explore the gaming application, such as by using a permutation engine 146b to determine the various permutations that a gaming application can perform. For example, the input control permutation engine 146b is configured to determine the various permutations that a gaming application can perform, such as in response to a given condition (e.g., a particular game state). That is, the input control permutation engine 146b is able to determine what should be the next set of controller input for a given input state data 405a-405n (e.g., game state). In this case, the permutation engine 146b discovers the different permutations for responding to the input state data, each permutation including a different set of actions to be taken. The auto sweeper engine 146a is then configured to go through the various permutations by controlling the game plays 401a-401n (e.g., by submitting appropriate controller inputs to the executing instances of the gaming application).

Further, the analyzer 140 is configured to perform quality analysis on the gaming application, such as for purposes of discovering weak points in the gaming application (e.g., excessively long and boring sequences, difficult sections, etc.), or flaws (e.g., glitches, loops, etc.). For example, the ma/route analyzer 441 is configured to analyze the output (e.g., game states) of the different permutations of the gaming application to discover the weak points in the gaming application. In one implementation, the game code identifier 443 is configured to discover a problem in the coding of the gaming application, wherein the code location 447 is provided as an output.

Figure 5E:
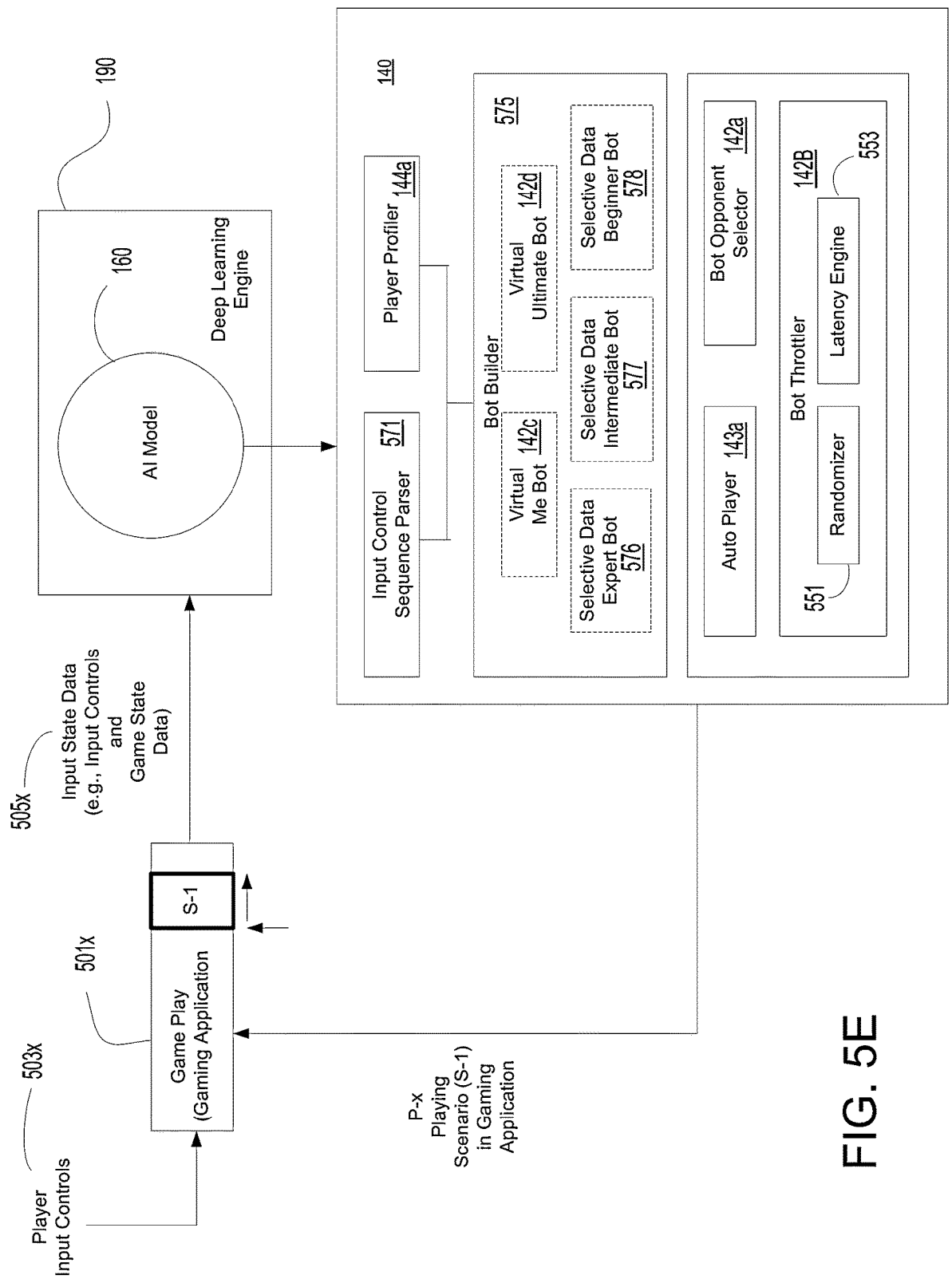
FIG. 5E illustrates a data flow diagram illustrating a process for providing an opponent for a player, wherein the opponent is directed by an AI model that is trained through a network of back-end servers executing instances of the gaming application, in accordance with one embodiment of the present disclosure.

FIG. 5E illustrates a data flow diagram illustrating a process for providing an opponent for a player, wherein the opponent is directed by an AI model that is trained through a network of back-end servers executing instances of the gaming application, in accordance with one embodiment of the present disclosure. A game play 501x of a gaming application is shown. The game play may be controlled by a player P-x through a corresponding client device, wherein an instance of the gaming application is executing at a back-end server of a streaming gaming service (e.g., cloud game system), as previously described. In other embodiments, the gaming application may be executing locally on the client device, and metadata is delivered to a back-end server for AI model support. The game play 501x is occurring during scenario S-1, and is controlled by player input controls 503x.

Input state data 505x from the game play 501x is provided to the analyzer 140 that is configured to analyze the output of the trained AI model 160, wherein the trained AI model 160 is implemented through the deep learning engine 190 (in an application phase and not a learning phase). The input state data 505x is received after the AI model 160 is trained, and as such may not be part of the training state data used for training the AI model, previously described. The AI model 160 is configured to provide an output, and the analyzer 140 is configured to perform or provide an action to be performed based on that analysis of the output.

Specifically, the analyzer 140 includes an input control sequence parser 571 and a player profiler 144a, each of which is previously introduced. For example, the input control sequence parser 147a is configured to determine the sequence of controller inputs used by the player to control the game play. The player profiler 144a of the analyzer 140 is configured to perform profiling of the player playing the gaming application (e.g., determine skill level of the player).

In addition, the analyzer 140 includes a bot builder 575, which is configured to build one or more bots (automatic player robots or opponents to be used for game play or to control characters in the game play). For example, the bot builder 575 may be configured to build an ultimate bot 142d that is learned by the AI model 160 through application of success criteria. As previously described, for a given set of inputs (e.g., input training data), a more successful pattern (e.g., rule including linked features and/or labels) is learned and chosen over a less successful pattern. In that manner, the best or ultimate bot 142d is trained that is the most successful at playing the gaming application. In another example, the bot builder 575 is configured to build a virtual player or virtual me bot 142c that simulates the first player. In one embodiment, the training state data is obtained from game plays by the first player at one or more client devices. That is, data from game plays of other players are not used for training the virtual me bot 142c. In that manner, the AI model is learned off of metadata created by game plays of the first player, and as such, the AI model would be a direct reflection of that first player.

In still another example, the bot builder 575 is configured to build one or more bots of varying skill levels. For example, various skill bots may include an expert bot 576, an intermediate bot 577, and a beginner bot 578. In one implementation, the training state data may be parsed to reflect the corresponding skill level, such that the AI model is trained using data of a corresponding skill level. For example, the success criteria may be defined such that only game plays of expert players are used to train the AI model in order so that the bot builder 575 can build the expert bot 576. In another example, success criteria may be defined such that only game plays of players of intermediate skill are used to train the AI model in order so that the bot builder 575 can build the intermediate bot 577. In still another example, success criteria may be defined such that only game plays of players of a beginner skill are used to train the AI model in order so that the bot builder 575 can build the beginner bot 578. In still another embodiment, a bot of a particular skill level may be implemented by using the virtual ultimate bot 142d and applying one or more conditions to the performance of the ultimate bot, to include introducing randomness and/or latency. For example, the performance of the ultimate bot may be compromised by introducing latency between execution of controller inputs in a sequence, or by introducing random controller inputs into a given sequence of controller inputs that are known to be highly successful in accomplishing a task.

In addition, the action generator 170 of the analyzer 140 includes an auto player 143a that is configured to auto play the gaming application, such as for purposes of automatically training the AI model, as directed by the AI model trainer 143b, according to the predefined objective. For example, the predefined objective may be to automatically train the AI model 160. Specifically, the analyzer 140 includes the auto player 143a that is configured to auto play the gaming application, as directed by the AI model trainer 143b.

The analyzer 140 includes the auto player 143a that is configured to auto play the gaming application for purposes of providing a bot opponent (e.g., automatically reactive robot opponent). The bot opponent selector 142a is configured to select the appropriate bot, such as those bots previously introduced (e.g., ultimate bot 142d, virtual me bot 142c, and variously skilled bots to include the expert bot 576, intermediate bot 577, or beginner bot 578). A player controlling the game play may control a character that is going up against a bot opponent. In particular, the auto player 143a is configured to implement the selected automatic robot (bot). For a given set of input state data 505x, an output may be analyzed by the analyzer 140 by the auto player 143a to determine the next set of instructions for controlling a bot found in the gaming application.

In addition, a bot throttler 142b is configured to apply a difficulty setting as reflected in the corresponding bot (e.g., to the operations of the bot). The bot throttler may start with the ultimate bot 142d, or any other learned bot. The difficulty setting may be applied actively by the player, or may be applied according to a user profile. For example, if the player was an expert as indicated through the profile, then the difficulty would be set higher (opponent bot would be difficult to beat). On the other hand, if the player were a beginner, then the difficulty setting would be lower (opponent bot would be easy to beat). As shown, the bot throttler 142b may include a randomizer 551 configured to introduce random instructions. A corresponding bot with a high degree of difficulty would have a low level of random instructions inserted into a stream of instructions that is normally used for controlling the ultimate bot 142d. As such, the resulting bot would be similar to the ultimate bot 142d. On the other hand, a resulting bot having a low degree of difficulty would have a high level of random instructions inserted into the stream of instructions used for normally controlling the ultimate bot 142d. Because there are random instructions, the resulting bot would act erratically, and not perform as well as the ultimate bot 142d. In addition, a latency engine 553 may be implemented to apply a difficulty setting. For a resulting bot with a high degree of difficulty, there would be limited or no latency introduced into the stream of instructions that would normally be applied for an ultimate bot 142d. On the other hand, for a resulting bot with a low degree of difficulty (e.g., for a beginner), there would be a greater amount of latency introduced into the stream of instructions that would normally be applied for an ultimate bot 142d. In that manner, the resulting bot having a low difficulty setting would then be acting very slowly, such as during an attack, or during a defensive maneuver and as such would likely be easily defeated.

Figure 5F:
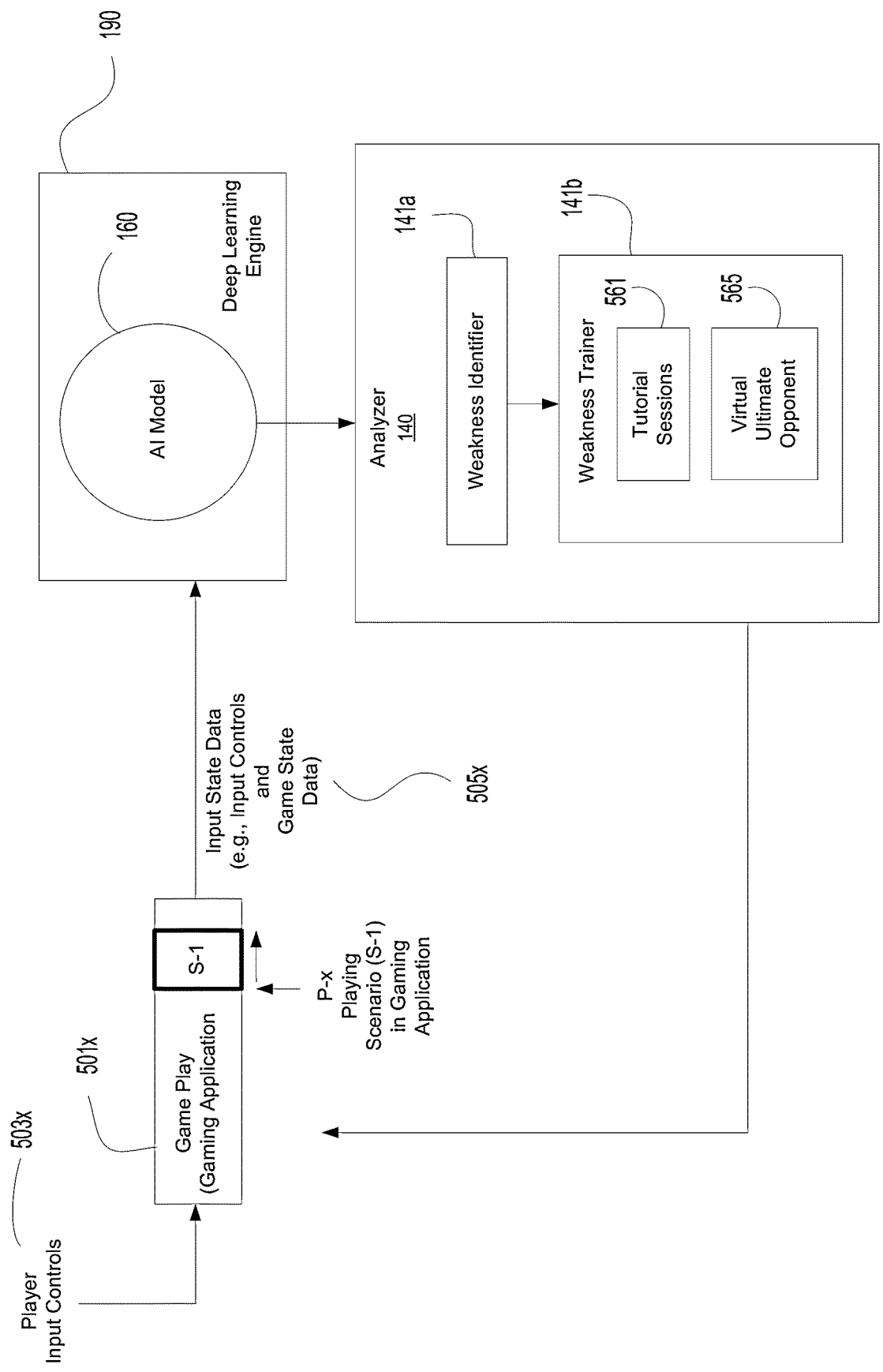
FIG. 5F illustrates a data flow diagram illustrating a process for identifying weaknesses of a player, and providing various services to train the player to overcome those weaknesses, in accordance with one embodiment of the present disclosure.

FIG. 5F illustrates a data flow diagram illustrating a process for identifying weaknesses of a player, and providing various services to train the player to overcome those weaknesses, in accordance with one embodiment of the present disclosure. A game play 501x of a gaming application is shown. The game play may be controlled by a player P-x through a corresponding client device, wherein an instance of the gaming application is executing at a back-end server of a streaming gaming service (e.g., cloud game system), as previously described. In other embodiments, the gaming application may be executing locally on the client device, and metadata is delivered to a back-end server for AI model support. The game play 501x is occurring during scenario S-1, and is controlled by player input controls 503x.

Input state data 505x from the game play 501x is provided to the analyzer 140 that is configured to analyze the output of the trained AI model 160, wherein the trained AI model 160 is implemented through the deep learning engine 190 (in an application phase and not a learning phase). The input state data 505x is received after the AI model 160 is trained, and as such may not be part of the training state data used for training the AI model, previously described. The AI model 160 is configured to provide an output, and the analyzer 140 is configured to perform or provide an action to be performed based on that analysis of the output.

In addition, the action generator 170 of the analyzer 140 includes an auto player 143*a* that is configured to auto play the gaming application, such as for purposes of automatically training the AI model, as directed by the AI model trainer 143*b*, according to the predefined objective. For example, the predefined objective may be to automatically train the AI model 160.

In particular, the analyzer 140 includes a weakness identifier 141*a* that is configured to determine a weakness of a corresponding player that is controlling a corresponding game play according to a predefined objective to provide coaching. The weakness is determined through analysis of the game play of the player.

For example, the analysis may include comparisons to a success criteria. In particular, a weakness may be identified by determining that first input state data has a lower than average degree of success, as determined by analysis of the output from the AI model in comparison to other outputs resulting from comparable input state data. As an illustration, for a given input state data (e.g., first input state data), a first set of interconnected nodes that produce an output in response to the first input state data may have a lower value when satisfying a corresponding success criteria than an average value determined for similar game plays having comparable input state data. That is, the comparison is made with game plays having the same or similar input state data. As such, the weakness identifier 141*a* may determine a weakness of the player.

Further, a weakness trainer 141*b* is configured to perform services that help the player to overcome the weakness. For example, the weakness trainer 141*b* may provide one or more tutorials 561 (e.g., videos, gaming sessions, etc.) that are targeted at improving the skills of the player in relation to the player's weakness. The tutorials may include video tutorials that provide instructions on how to strengthen skills of the player related to the weakness, or gaming sessions that are directed at strengthen skills related to the weakness. In addition, a training session addressing the identified weakness may be presented to the player via a corresponding client device. Also, the weakness trainer 141*b* may be configured to provide a bot that is specialized to direct the game play in a manner that exposes the weakness of the player, in one embodiment. The bot may be a virtual ultimate opponent 565 for the player to play against. The virtual ultimate opponent 565 may be the ultimate bot 142*d*, as previously described.

Figure 6:
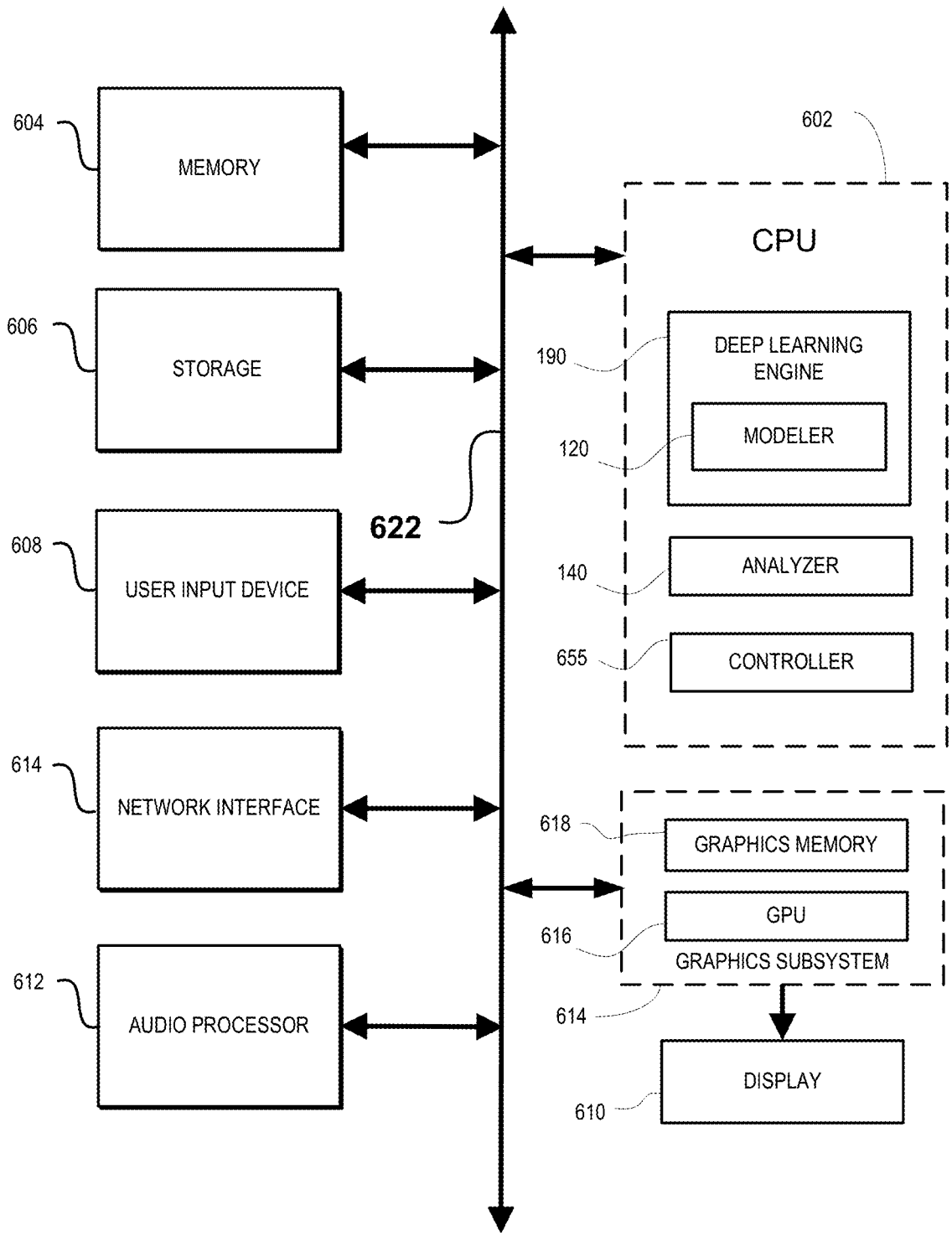
FIG. 6 illustrates components of an example device that can be used to perform aspects of the various embodiments of the present disclosure.

FIG. 6 illustrates components of an example device 600 that can be used to perform aspects of the various embodiments of the present disclosure. For example, FIG. 6 illustrates an exemplary hardware system suitable for training an AI model that is capable of performing various functionalities in relation to a gaming application and/or game plays of the gaming application, in accordance with one embodiment of the present disclosure. This block diagram illustrates a device 600 that can incorporate or can be a personal computer, a server computer, gaming console, mobile device, or other digital device, each of which is suitable for practicing an embodiment of the invention. Device 600 includes a central processing unit (CPU) 602 for running software applications and optionally an operating system. CPU 602 may be comprised of one or more homogeneous or heterogeneous processing cores.

In accordance with various embodiments, CPU 602 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 602 may be configured to include the AI engine (e.g., deep learning) 190 that is configured to support and/or perform learning operations with regards to providing various functionalities (e.g., predicting) in relation to a gaming application and/or game plays of the gaming application. The deep leaning engine may include a modeler 120 that is configured for building and/or training the AI model that is configured to provide the various functionalities related to the gaming application and/or game plays of the gaming application. Further, the CPU 602 includes an analyzer 140 that is configured for implementing the trained AI model. The trained AI model provides an output in response to the input, wherein the output is dependent on the predefined functionality of the trained AI model. The trained AI model may be used to determine what actions can be taken during the game play. The analyzer 140 determines which is the appropriate action to be taken. That is, the analyzer 140 is configured to perform various functionalities in relation to a gaming application and/or game plays of the gaming application. The analyzer 140 is configured to analyze the output from the trained AI model 160 for a given input (e.g., controller input, game state data, success criteria), and provide a response.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 614 is further connected with data bus 622 and the components of the device 600. The graphics subsystem 614 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within AI engine 190 to provide additional processing power, such as for the AI or deep learning functionality.

The graphics subsystem 614 periodically outputs pixel data for an image from graphics memory 618 to be displayed on display device 610, or to be projected by projection system 640. Display device 610 can be any device capable of displaying visual information in response to a signal from the device 600, including CRT, LCD, plasma, and OLED displays. Device 600 can provide the display device 610 with an analog or digital signal, for example.

Accordingly, the present disclosure described systems and methods implementing deep learning (also referred to as machine learning) techniques to build an AI model using training data collected from a network of servers executing instances of a gaming application supporting one or more game plays, and for using the trained AI model to provide various functionalities relating to the gaming application and/or game plays of the gaming application, in various embodiments.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
    training a global artificial intelligence (AI) model for a video game using training state data collected from a plurality of game plays of the video game by a plurality of players and associated success criteria, wherein the global AI model is configured to play the video game, wherein collection of the training state data is limited to playing a scenario of the video game in the plurality of game plays;
    receiving input state data during a game play of the video game by a user while the game play is playing the scenario;
    receiving a game response to the input state data during the game play while the game play is playing the scenario; and
    training a personal AI model for the user by applying the input state data and the game response to a deep learning engine to modify the global AI model, wherein the input state data and the game response is assigned a success criteria having priority over the associated success criteria of the training state data, wherein the personal AI model is configured to simulate the user playing the scenario of the video game.

2. The method of claim 1, further comprising:
    applying the input state data to the global AI model to determine a predicted degree of success for the game play; and
    providing a recommendation on how to play the video game based on the predicted degree of success to a device of the user,
    wherein the recommendation includes next input state data to direct the game play to a recommended game response that is different than the game response generated in response to the input state data.

3. The method of claim 1, wherein the applying the input state data and the game response includes:
    adjusting the associated success criteria as implemented in the deep learning engine when training the personal AI model to achieve incrementally the game response given the input state data.

4. The method of claim 1,
wherein the training the global AI model includes training the global AI model to play the scenario of the video game using the training state data; and
wherein the training the personal AI model includes training the personal AI model to play the scenario using the input state data and the game response.

5. The method of claim 4, further comprising:
applying the input state data to the personal AI model to generate next input state data; and
providing a recommendation on how to play the video game including the next input state data, wherein the next input state data is configured to simulate the user playing through the scenario.

6. The method of claim 5, further comprising:
accessing a user profile for the user; and
generating the recommendation based on the user profile.

7. The method of claim 4, further comprising:
receiving new input state data during the game play;
receiving a new game response to the new input state data during the game play; and
training the personal AI model by applying the new input state data and the new game response to the deep learning engine.

8. The method of claim 1, wherein the training the global AI model includes:
executing a plurality of instances of the video game supporting the plurality of game plays;
collecting the training state data that is associated with the plurality of game plays;
defining the associated success criteria; and
providing the training state data and the associated success criteria to the deep learning engine.

9. The method of claim 1,
wherein the associated success criteria is used to prioritize between the training state data from the plurality of game plays.

10. A non-transitory computer-readable medium storing a computer program for performing a method, the computer-readable medium comprising:
program instructions for training a global artificial intelligence (AI) model for a video game using training state data collected from a plurality of game plays of the video game by a plurality of players and associated success criteria, wherein the global AI model is configured to play the video game, wherein collection of the training state data is limited to playing a scenario of the video game in the plurality of game plays;
program instructions for receiving input state data during a game play of the video game by a user while the game play is playing the scenario;
program instructions for receiving a game response to the input state data during the game play while the game play is playing the scenario; and
program instructions for training a personal AI model for the user by applying the input state data and the game response to a deep learning engine to modify the global AI model, wherein the input state data and the game response is assigned a success criteria having priority over the associated success criteria of the training state data, wherein the personal AI model is configured to simulate the user playing the scenario of the video game.

11. The non-transitory computer-readable medium of claim 10, wherein the program instructions for applying the input state data and the game response includes:
program instructions for adjusting the associated success criteria as implemented in the deep learning engine when training the personal AI model to achieve incrementally the game response given the input state data.

12. The non-transitory computer-readable medium of claim 10,
wherein the program instructions for training the global AI model includes program instructions for training the global AI model to play the scenario of the video game using the training state data; and
wherein the program instructions for training the personal AI model includes program instructions for training the personal AI model to play the scenario using the input state data and the game response.

13. The non-transitory computer-readable medium of claim 12, further comprising:
program instructions for applying the input state data to the personal AI model to generate next input state data; and
program instructions for providing a recommendation on how to play the video game including the next input state data, wherein the next input state data is configured to simulate the user playing through the scenario.

14. The non-transitory computer-readable medium of claim 12, further comprising:
program instructions for receiving new input state data during the game play;
program instructions for receiving a new game response to the new input state data during the game play; and
program instructions for training the personal AI model by applying the new input state data and the new game response to the deep learning engine.

15. The non-transitory computer-readable medium of claim 10, wherein the program instructions for training the global AI model includes:
program instructions for executing a plurality of instances of the video game supporting the plurality of game plays;
program instructions for collecting the training state data that is associated with the plurality of game plays;
program instructions for defining the associated success criteria; and
program instructions for providing the training state data and the associated success criteria to the deep learning engine.

16. A computer system comprising:
a processor;
memory coupled to the processor and having stored therein instructions that, if executed by the computer system, cause the computer system to execute a method, comprising:
training a global artificial intelligence (AI) model for a video game using training state data collected from a plurality of game plays of the video game by a plurality of players and associated success criteria, wherein the global AI model is configured to play the video game, wherein collection of the training state data is limited to playing a scenario of the video game in the plurality of game plays;
receiving input state data during a game play of the video game by a user while the game play is playing the scenario;
receiving a game response to the input state data during the game play while the game play is playing the scenario; and
training a personal AI model for the user by applying the input state data and the game response to a deep learning engine to modify the global AI model, wherein the input state data and the game response is assigned a success criteria having priority over the associated success criteria of the training state data, wherein the personal AI model is configured to simulate the user playing the scenario of the video game.

17. The computer system of claim 16, wherein in the method the applying the input state data and the game response includes:

adjusting the associated success criteria as implemented in the deep learning engine when training the personal AI model to achieve incrementally the game response given the input state data.

18. The computer system of claim 16, wherein in the method the training the global AI model includes training the global AI model to play the scenario of the video game using the training state data; and wherein in the method the training the personal AI model includes training the personal AI model to play the scenario using the input state data and the game response.

19. The computer system of claim 18, the method further comprising:

applying the input state data to the personal AI model to generate next input state data; and providing a recommendation on how to play the video game including the next input state data, wherein the next input state data is configured to simulate the user playing through the scenario.

20. The computer system of claim 18, the method further comprising:

receiving new input state data during the game play;

receiving a new game response to the new input state data during the game play; and training the personal AI model by applying the new input state data and the new game response to the deep learning engine.

* * * * *